United States Patent
Bratton et al.

(10) Patent No.: US 10,183,299 B1
(45) Date of Patent: Jan. 22, 2019

(54) AIR PURIFICATION SYSTEM

(71) Applicant: CRS Industries, Inc., Concord, NC (US)

(72) Inventors: Eric Bratton, Concord, NC (US); Eric Streed, Atlanta, GA (US); Hugh Bradley, Irmo, SC (US)

(73) Assignee: CRS Industries, Inc, Concord, NC (US)

( * ) Notice: Subject to any disclaimer, the term of this patent is extended or adjusted under 35 U.S.C. 154(b) by 703 days.

(21) Appl. No.: 14/637,264

(22) Filed: Mar. 3, 2015

Related U.S. Application Data

(60) Provisional application No. 61/947,986, filed on Mar. 4, 2014, provisional application No. 62/053,129, filed on Sep. 20, 2014.

(51) Int. Cl.
*B01D 53/02* (2006.01)
*B03C 3/017* (2006.01)
*B03C 3/82* (2006.01)

(52) U.S. Cl.
CPC .............. *B03C 3/0175* (2013.01); *B03C 3/82* (2013.01)

(58) Field of Classification Search
CPC ................................ B03C 3/0175; B03C 3/82
See application file for complete search history.

(56) References Cited

U.S. PATENT DOCUMENTS

| | | | |
|---|---|---|---|
| 3,370,646 A * | 2/1968 | Hopper ................. | F28F 19/004 165/95 |
| 3,816,980 A * | 6/1974 | Schwab ................ | B03C 3/0175 96/54 |
| 3,862,826 A | 1/1975 | Haupt | |
| 3,892,544 A | 7/1975 | Haupt | |
| 3,977,848 A | 8/1976 | Oliphant | |
| 4,019,367 A | 4/1977 | Norsworthy | |
| 5,061,296 A | 10/1991 | Sengpiel et al. | |
| 5,330,559 A * | 7/1994 | Cheney ................... | B03C 3/155 95/63 |
| 5,401,299 A | 3/1995 | Kroeger et al. | |
| 5,474,599 A * | 12/1995 | Cheney ................... | B03C 3/155 95/63 |
| 5,542,964 A | 8/1996 | Kroeger et al. | |
| 5,690,720 A * | 11/1997 | Spero ..................... | B03C 3/155 96/26 |
| 6,059,852 A * | 5/2000 | Olson ................ | B01D 46/0005 55/481 |
| 2006/0185511 A1* | 8/2006 | Tepper ..................... | B03C 3/16 95/71 |
| 2007/0029477 A1* | 2/2007 | Miller .................. | G01N 27/624 250/290 |
| 2009/0025402 A1* | 1/2009 | Mello ..................... | B03C 3/09 62/78 |

* cited by examiner

*Primary Examiner* — Christopher P Jones
(74) *Attorney, Agent, or Firm* — Frijouf, Rust & Pyle P.A.

(57) ABSTRACT

An input plenum is disclosed for mounting to an air conditioning/heating unit. The input plenum comprises an air filter track for introducing and removing the air filter. A grid array track is located within the input plenum. The grid array track enables a grid array and an electronic generator to be added to the plenum to upgrade the plenum into an air purification system. An improved one-piece grid may be incorporated into the grid array for generating an electric field in the air purification system.

16 Claims, 24 Drawing Sheets

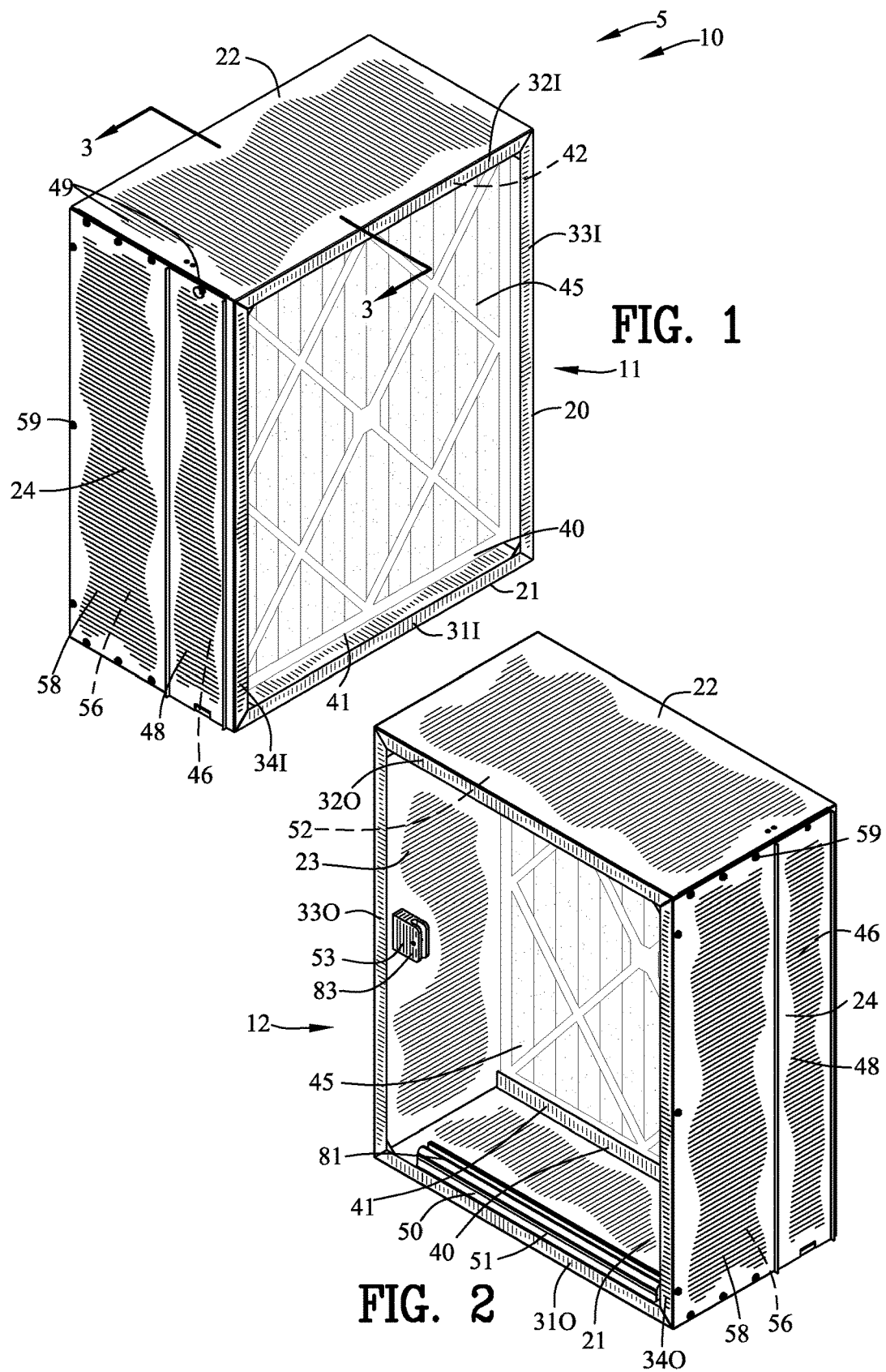

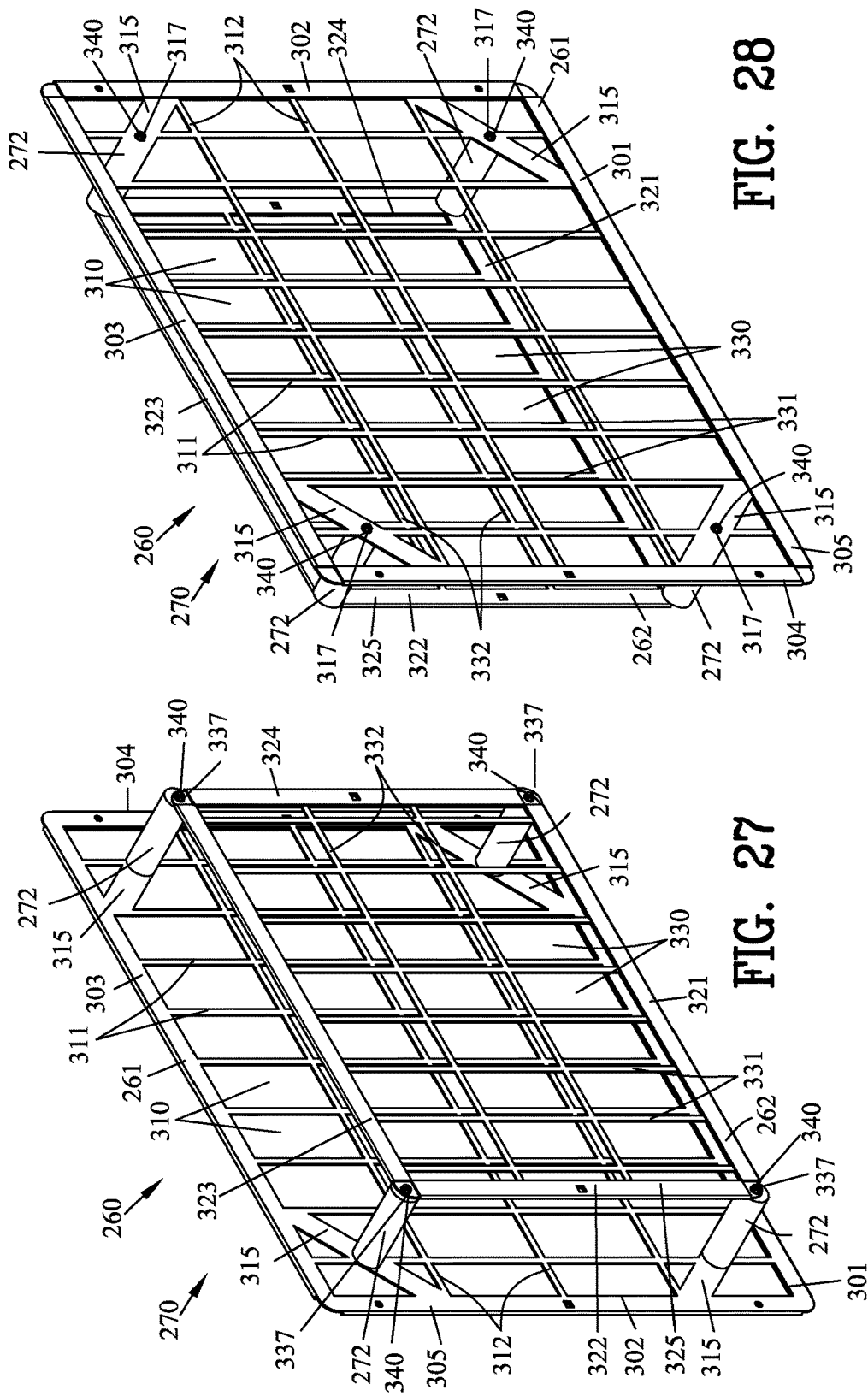

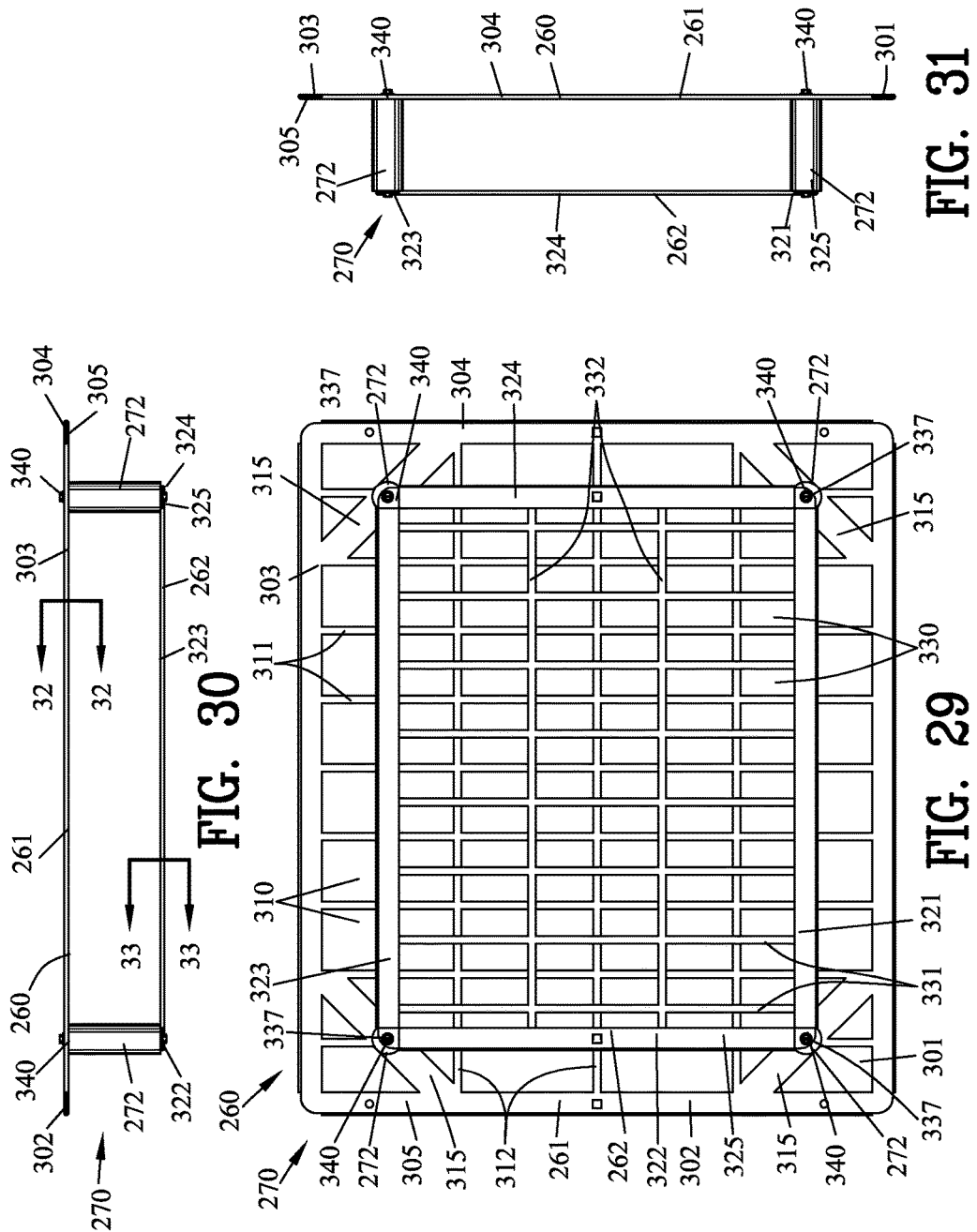

AIR PURIFICATION SYSTEM

CROSS-REFERENCE TO RELATED APPLICATIONS

This application claims benefit of U.S. Patent Provisional application No. 61/947,986 filed Mar. 4, 2014 and U.S. Patent Provisional application No. 62/053,129 filed Sep. 20, 2014. All subject matter set forth in provisional application No. 61/947,986 filed Mar. 4, 2014 and provisional application No. 62/053,129 filed Sep. 20, 2014 is hereby incorporated by reference into the present application as if fully set forth herein.

BACKGROUND OF THE INVENTION

Field of the Invention

The invention relates to air purification and more particularly to an improved electronic air purification system for use with an air conditioning/heating unit.

Description of the Related Art

Air quality and air purification have been concerns since the early 1800s. Through the years, scientists continued to develop more sophisticated and effective systems to achieve cleaner air. Today, commercial air purification systems which may be installed as stand alone units or incorporated into an air handler or HVAC unit are commonly found in medical, commercial and industrial buildings. The elimination of airborne contaminants such as pollen, dust, mold spores and others acting as allergens are readily eliminated by today's air purification systems. However, many conventional air filtration systems are unable to capture particles in the micron and sub micron range. Enhanced particle removal has been achieved using purification systems which subject airborne contaminants to complex electrical fields.

Air purification systems reduce energy costs by air recirculation, thereby reducing the need for large amounts of outside air. Recirculated air remains close to the desired interior space temperature, therefore additional heating or cooling of the air passing through the HI-VAC system is reduced.

Although the development of air purification systems has been primarily directed to units installed in commercial buildings and the like, there remains the need for high efficiency air purification systems for residential applications.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 3,862,826 to Haupt discloses a filter system for removing pollutant particles suspended in a fluid body. The system comprising a precharging means to electrically precharge the suspended particles, and a precipitator means to attract and collect the charged particles. A fluid turbulator means disposed between the precharging means and precipitator means alters the fluid flow to enhance the collection of the charged particles and neutralizing means neutralizes the fluid flow before exiting the filter system.

U.S. Pat. No. 3,892,544 to Haupt discloses an electrodynamic electrostatic gas charge system to separate combined particles of dissimilar substances and recombination into combined particles of similar substance. The system comprises an antenna array including a first and second electrode means disposed across the gas flow and a signal generator means. The signal generator means includes a first and second signal output generator means coupled to the first and second electrode means respectively to generate charged force fields to separate dissimilar substances and recombine like particles.

U.S. Pat. No. 3,977,848 to Oliphant discloses an electrodynamic gas charge system comprising at least one electrically charged element and screen element arranged relative to each other to form a voltage gradient therebetween. The system includes means to vary the voltage gradient between the electrically charged element and screen element. The elements are disposed across a gas flow such that particles of dissimilar substances are separated by the charged force field and recombined with like particles.

U.S. Pat. No. 4,019,367 to Norsworthy discloses an improved method and apparatus for the detection and measurement of concentrations of foreign substances in a fluid, particularly atmospheric gas. Transducers and signal modifying devices are electronically connected in a predetermined arrangement so as to determine the concentration of foreign matter and display this concentration as a linear function determined by the amount of foreign matter found.

U.S. Pat. No. 5,061,296 to Sengpiel, et al. discloses an air purification system for subjecting air to a complex electrical field including sensors and a monitor/controller for monitoring effectiveness, operational conditions of the electrical field and the system, and ambient conditions of the air being purified. The level of the high voltage, RMS and high frequency is processed so that frequency, RMS and high D.C. can be measured at a low D.C. voltage.

U.S. Pat. No. 5,401,299 to Kroeger, et al. discloses an air purification system where air is subjected to complex electrical field resulting from a DC voltage and AC frequency in kilovolt and kilohertz range respectively, applied to screen assembly in air path. DC amplitude and AC frequency self regulate to selected parameters. Parameters are selectable independently of one another.

U.S. Pat. No. 5,542,964 to Kroeger, et al. discloses an air purification system where air is subjected to complex electrical field resulting from a DC voltage and AC frequency in kilovolt and kilohertz range respectively, applied to screen assembly in air path. DC amplitude and AC frequency self regulate to selected parameters. Parameters are selectable independently of one another.

Although the aforementioned prior art have contributed to the development of the art of air purification, none of these prior art patents have solved the needs of this art.

Therefore, it is an object of the present invention to provide an improved apparatus for air purification in a residential environment.

Another object of this invention is to provide an improved apparatus for air purification in an environment which is readily retrofitted to an existing HVAC system.

Another object of this invention is to provide an improved apparatus that is simple to install by an installer with limited skills.

Another object of this invention is to provide an improved apparatus that is simple for the operator to use.

Another object of this invention is to provide an improved apparatus that is easy to cost effectively produce.

Another object of this invention is to provide an improved grid for generating an electric field in the air purification system.

Another object of this invention is to provide an improved grid for generating an electric field in the air purification system formed from a single sheet of a conductive material.

Another object of this invention is to provide an improved method for forming a grid from a single sheet of a conductive material for an air purification system.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved input plenum for mounting to an air conditioning/heating unit. The improved input plenum comprises a frame having peripheral walls defining an air input and an air output. An air filter track is secured relative to the frame for positioning an air filer between the air input and the air output. An air filter aperture is defined in a selected peripheral wall adjacent to the air filter track. An air filter aperture closure covers the filter aperture for introducing and removing the air filter into the air filter track. A grid track is secured relative to the frame.

In another embodiment, the invention is incorporated into an air purification system for mounting to an air conditioning/heating unit comprising a frame having peripheral walls defining an air input and an air output. An air filter track is secured relative to the frame for positioning an air filter between the air input and the air output. A removable filter access panel is defined in a selected peripheral wall of the frame for introducing and removing an air filter into the frame between the air input and the air output. A filter aperture closure covers the filter aperture for introducing and removing the air filter into the air filter track. A grid track is secured relative to the frame. A grid array aperture is defined in the selected peripheral wall of the frame adjacent to the grid track. A grid array closure covers the grid array aperture.

In still another embodiment, the invention is incorporated into an air purification system for mounting to an air conditioning/heating unit comprising a frame having peripheral walls defining an air input and an air output. An air filter track is secured relative to the frame for positioning an air filter between the input and the air output. A grid track is secured relative to the frame. A selected peripheral wall is removable from the frame. An air filter aperture is defined in the selected peripheral wall for introducing and removing an air filter into the frame between the air input and the air output. A filter aperture closure covers the filter aperture. A replacement peripheral wall is dimensioned substantially identically to the selected peripheral wall. A replacement air filter aperture is defined in the replacement peripheral wall. A grid array is secured to an inside side surface of the replacement peripheral wall. An electronic generator is mounted to an outer surface of the replacement peripheral wall and connected to the grid array. The replacement peripheral wall replaces the selected peripheral wall and is secured to the frame with the replacement air filter aperture located adjacent to the air filter track and with the grid array located in the grid track for enabling the electronic generator and the grid array to generate electric fields for agglomerating particles within air passing from the air input to the air output.

In another embodiment of the invention, an improved grid is disclosed for generating an electric field in the air purification system. The improved grid comprises a one-piece grid formed from a single sheet of a conductive material extending between terminal ends. A peripheral frame is formed by about the terminal ends of the single sheet of conductive material. A plurality of apertures are formed in the one piece grid defining a multiplicity of grid elements and a multiplicity of transverse grid elements.

The invention is also incorporated into the method of making a one-piece grid for an air purification system. The method comprises the steps of providing a one-piece sheet of conductive material and cutting a plurality of apertures in the one-piece of conductive material to form a multiplicity of grid elements and in a multiplicity of intersecting transverse grid elements.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an isometric view illustrating an input of a first embodiment of the air plenum of the present invention;

FIG. 2 is an isometric view illustrating an output of the air plenum of FIG. 1;

FIG. 27 is an enlarged front isometric view of the improved grid array of FIGS. 24-25;

FIG. 28 is a rear view of the improved grid array of FIG. 27;

FIG. 29 is a front view of the improved grid array of FIG. 27;

FIG. 30 is a top view of the improved grid array of FIG. 29;

FIG. 31 is an end view of the improved grid array of FIG. 29;

Similar reference characters refer to similar parts throughout the several Figures of the drawings.

DETAILED DISCUSSION

Figure 3:
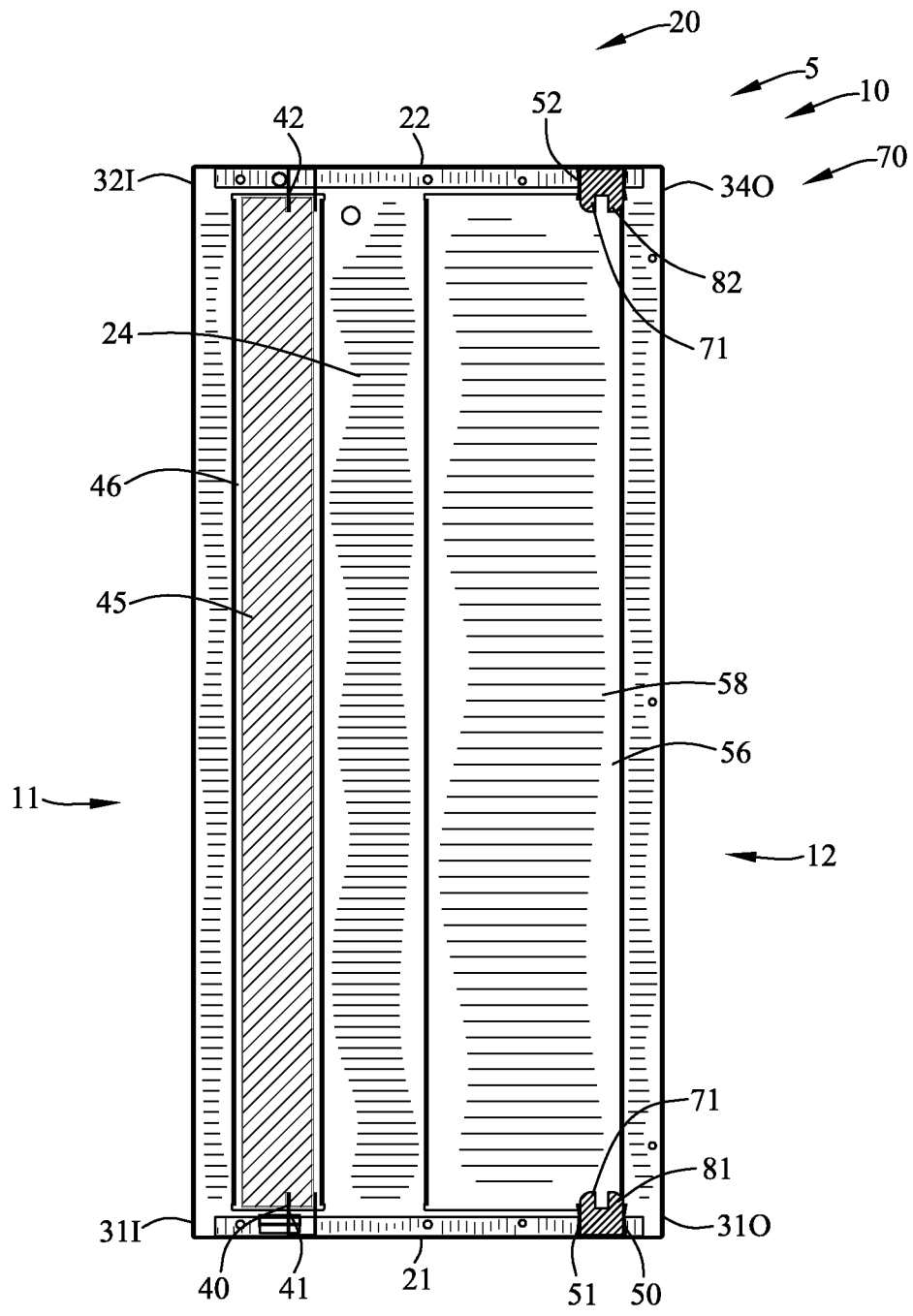
FIG. 3 is a sectional view along a line 3-3 in FIG. 1.
Figure 4:
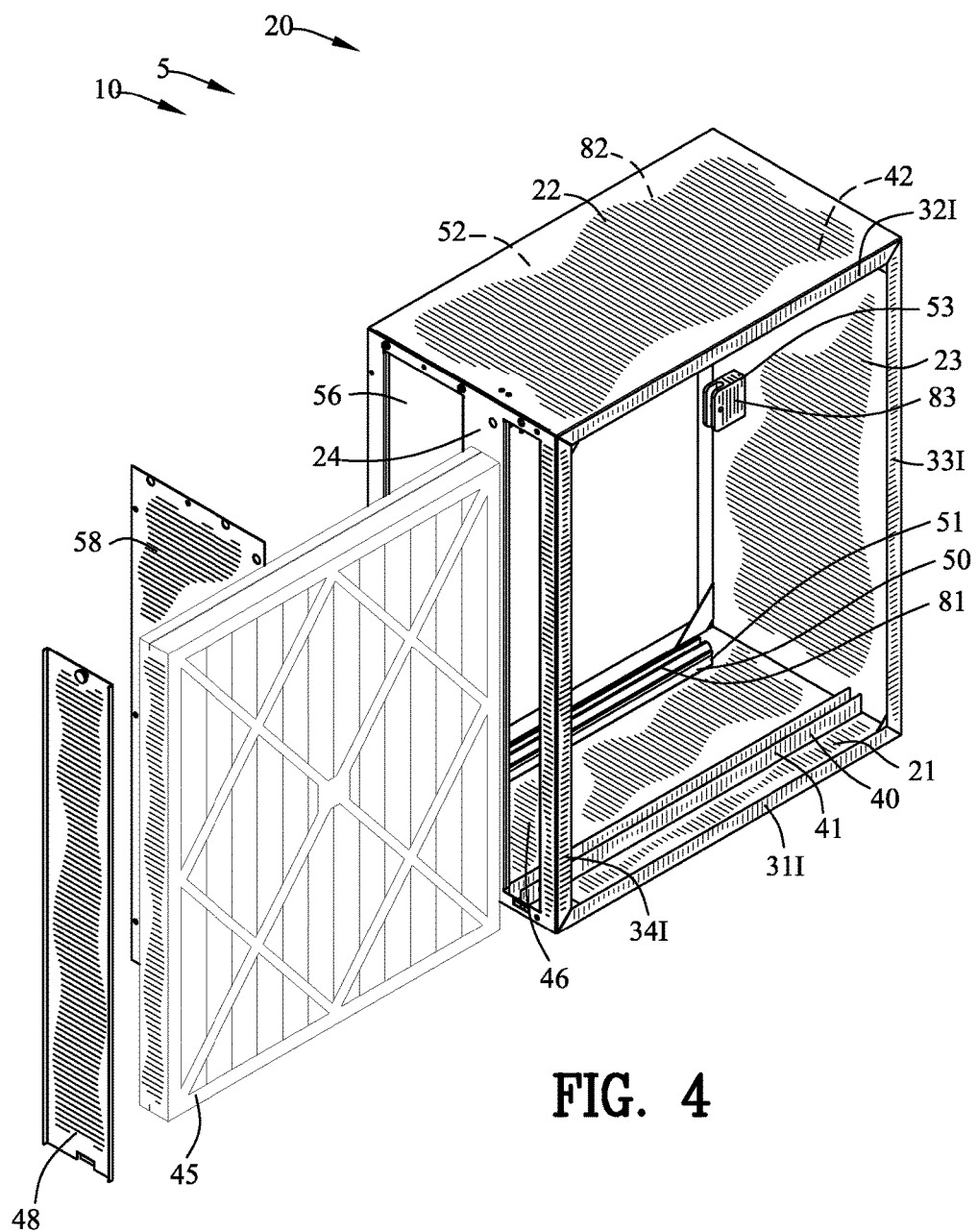
FIG. 4 is an exploded view of FIG. 1.

FIGS. 1-4 are various views illustrating a first embodiment of the air purification system 5 of the present invention. The air purification system 5 is adapted for use with a conventional air conditioning heating system (not shown).

The air purification system 5 comprises a plenum 10 for connection to the input of the conventional air conditioning heating system (not shown). The plenum 10 comprises a frame 20 having peripheral walls 21-24 with input wall supports 311-341 and output wall supports 310-340 for strengthening the frame 20.

Peripheral walls 21-24 close the periphery of the fame 20 defining an air input 11 and an air output 12 to the plenum 10. The plenum 10 is connected to the conventional air conditioning heating system (not shown) such that incoming air enters the air input 11 and exits the air output 12 of the plenum 10 to enter into an input of the conventional air conditioning heating system (not shown).

An air filter track 40 is secured relative to the frame 20 for positioning an air filer between the air input 11 and the air output 12 of the plenum 10. Preferably, the air filter track 40 comprises a first and a second air filter track 41 and 42 secured to opposite peripheral walls 21 and 22. The first and a second air filter track 41 and 42 are adapted to slidably receive a conventional air filter 45.

An air filter aperture 46 is defined in a selected peripheral wall 24 adjacent to the air filter track 40. An air filter aperture closure 48 is removably secured to the selected peripheral wall 24 for covering the filter aperture 46. Conventional mechanical fasteners 49 are provided for removably securing the air filter aperture closure 48 to the selected peripheral wall 24. The air filter aperture closure 48 enables the air filter 45 to be introduced and removed from the air filter track 40.

A grid track 50 is secured relative to the frame 40 downstream from the air filter track 40. Preferably, the grid track 50 comprises a first and a second grid track 51 and 52 secured to the opposite peripheral walls 21 and 22. A third grid track 53 is secured to the peripheral walls 23.

The selected peripheral wall 24 defines a grid aperture 56 defined in the selected peripheral wall 24 adjacent to the grid track 50. A grid aperture closure 58 is removably secured to the selected peripheral wall 24 for covering the grid aperture 56. Conventional mechanical fasteners 59 are provided for removably securing the grid aperture closure 58 to the selected peripheral wall 24.

The plenum 10 of the present invention is designed to cooperate with a conventional air conditioning/heating unit (not shown) for mounting a conventional air filter 45. The plenum 10 may be coupled to the air conditioning/heating unit (not shown) as an accessory unit or may be incorporated into the air conditioning/heating unit (not shown) as an original part of the air conditioning/heating unit (not shown) by an original equipment manufacturer.

The present invention enables the plenum 10 to be upgraded into an air purification system 5. The inclusion of the grid array track 50 and the grid aperture 56 enable a grid array 60 and an electronic generator 90 to be added to the plenum 10 to upgrade the plenum 10 into air purification system 5. The grid array 60 and the electronic generator 90 may be added to the plenum 10 to upgrade the plenum 10 into air purification system 5 at the time of installation of the plenum 10 or at a later time.

Figure 5:
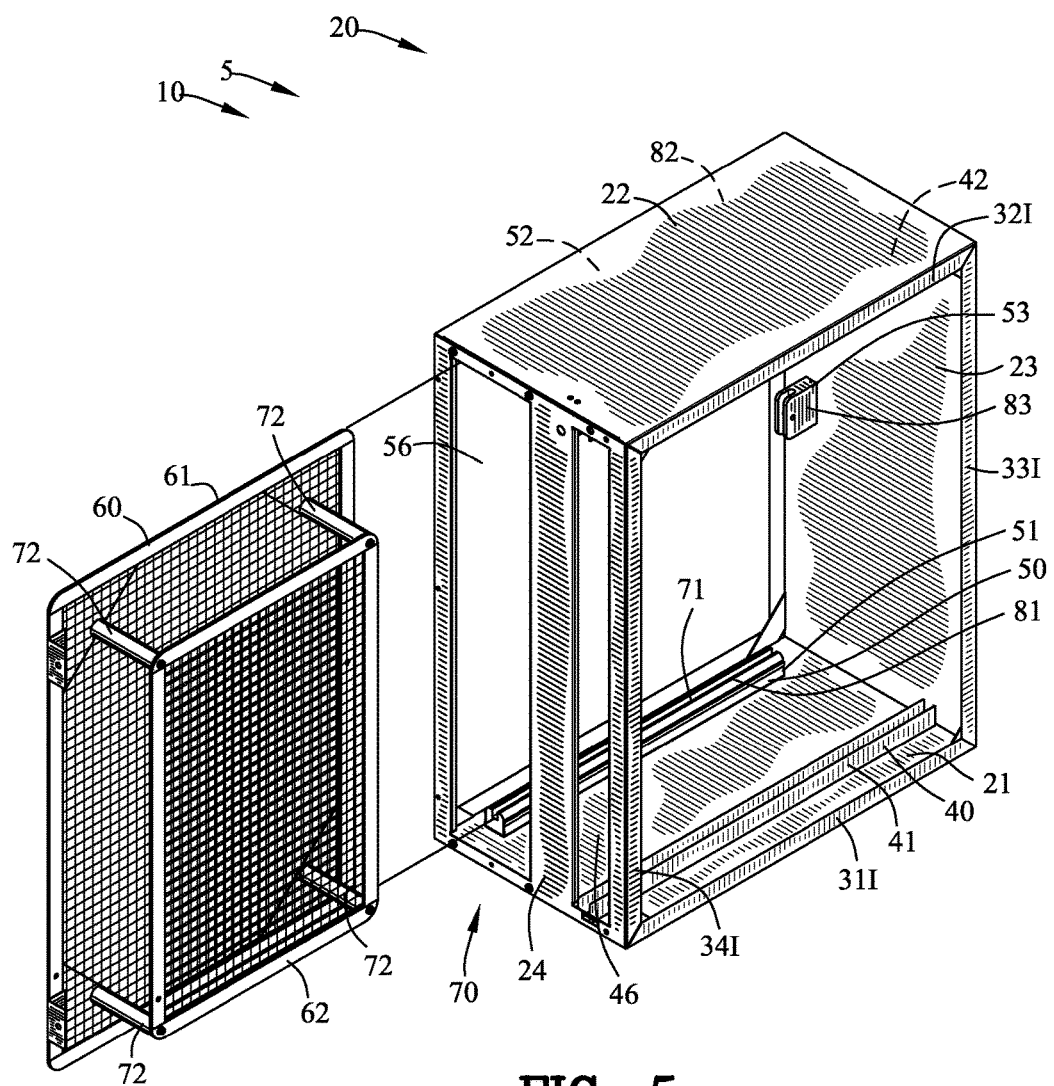
FIG. 5 is an isometric view illustrating the insertion of a grid array into a frame of the plenum of FIGS. 1-4 for creating an air purification system of FIGS. 1-4.

FIG. 5 is an isometric view illustrating the insertion of the grid array 60 into a frame 20 of the air purification system 5 of FIGS. 1-4. The grid array 60 is inserted through the grid aperture 56 into the grid track 50. The grid array 60 comprises a first and a second grid 61 and 62. Insulators 72 insulate the first and second grids 61 and 62 from each other and insulate the grid array 60 from the frame 20. A first insulator 71 insulates the first grid 61 of the grid array 60 from the frame 20. The second insulator 72 insulates the second grid 62 from the first grid 61.

The first insulator 71 comprises insulators 81-83 for insulating the first grid 61 from the peripheral walls 21-23. The insulators 81-83 are interposed between the first grid 61 and the first through third grid tracks 51-53. Insulators 85 and 86 insulate the first grid 61 from the peripheral wall 24.

The second insulator comprising a plurality of insulators 72 spaces the second grid 62 relative to the first grid 61. The first grid 61 is dimensionally larger than the second grid 62 for spacing the second grid 62 from the peripheral sidewalls 21-24 of the frame 20.

Figure 6:
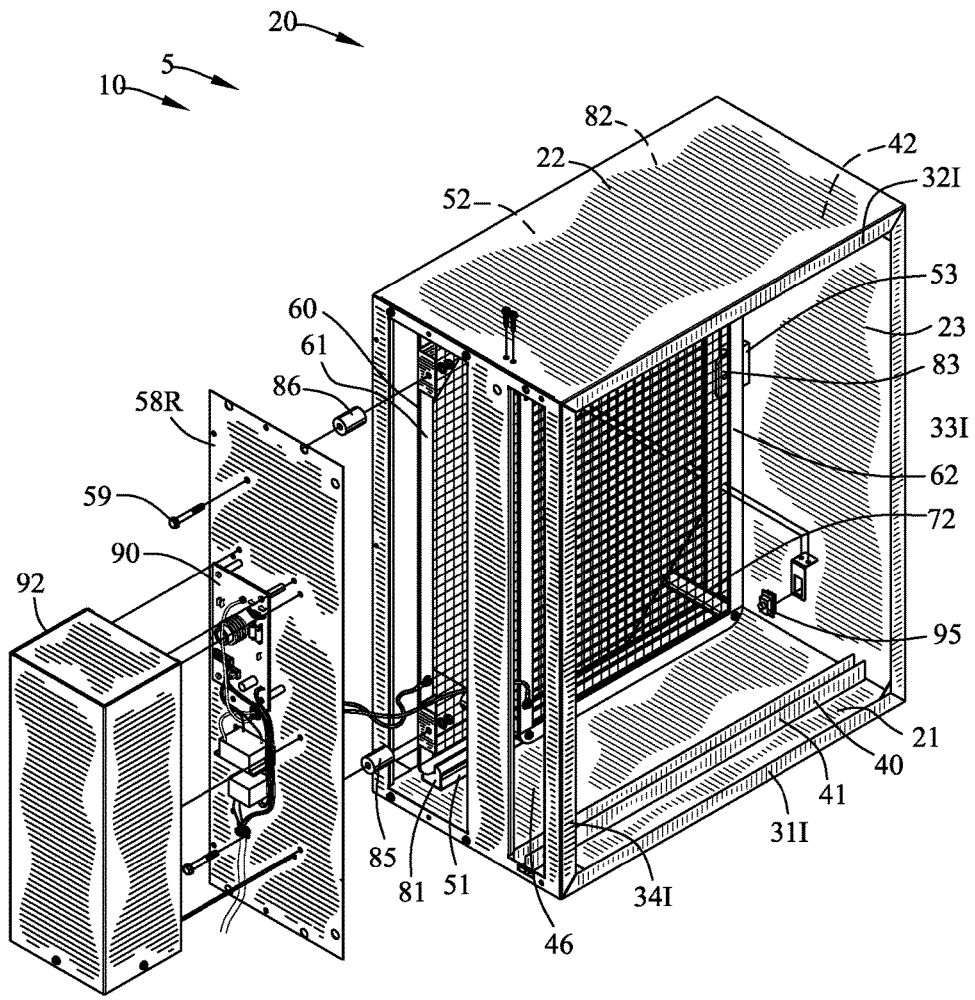
FIG. 6 illustrates the installation of a grid aperture closure containing an electronic grid generator for the grid array.

FIG. 6 is an isometric view illustrating the mounting of a replacement grid closure 58R to the frame 20 for closing the grid aperture 56. The replacement grid closure 58R may be secured to the frame 20 by reusing the conventional mechanical fasteners 59.

An electronic generator 90 is mounted to an outer surface of the replacement grid closure 58R. The electronic generator 90 is connected to the first and second grids 61 and 62 of the grid array 60.

Figure 7:
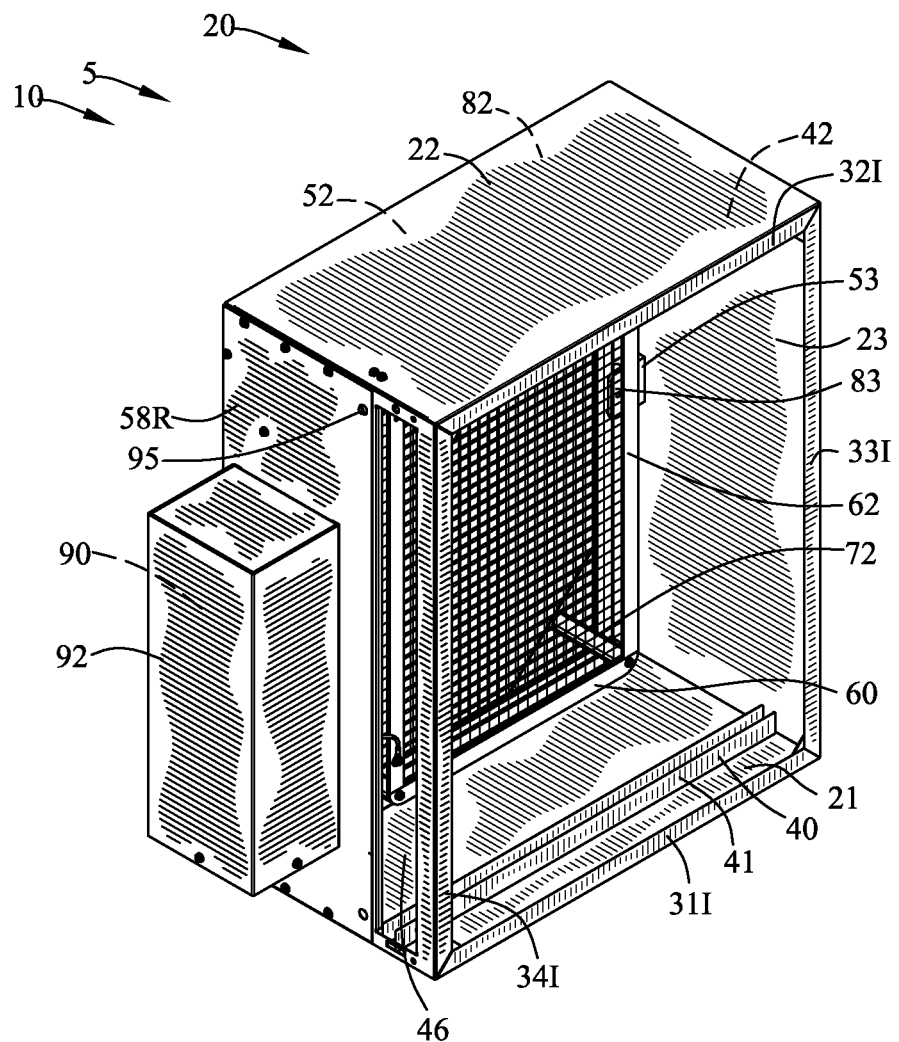
FIG. 7 illustrates the complete installation of the grid aperture closure containing the electronic grid generator.
Figure 8:
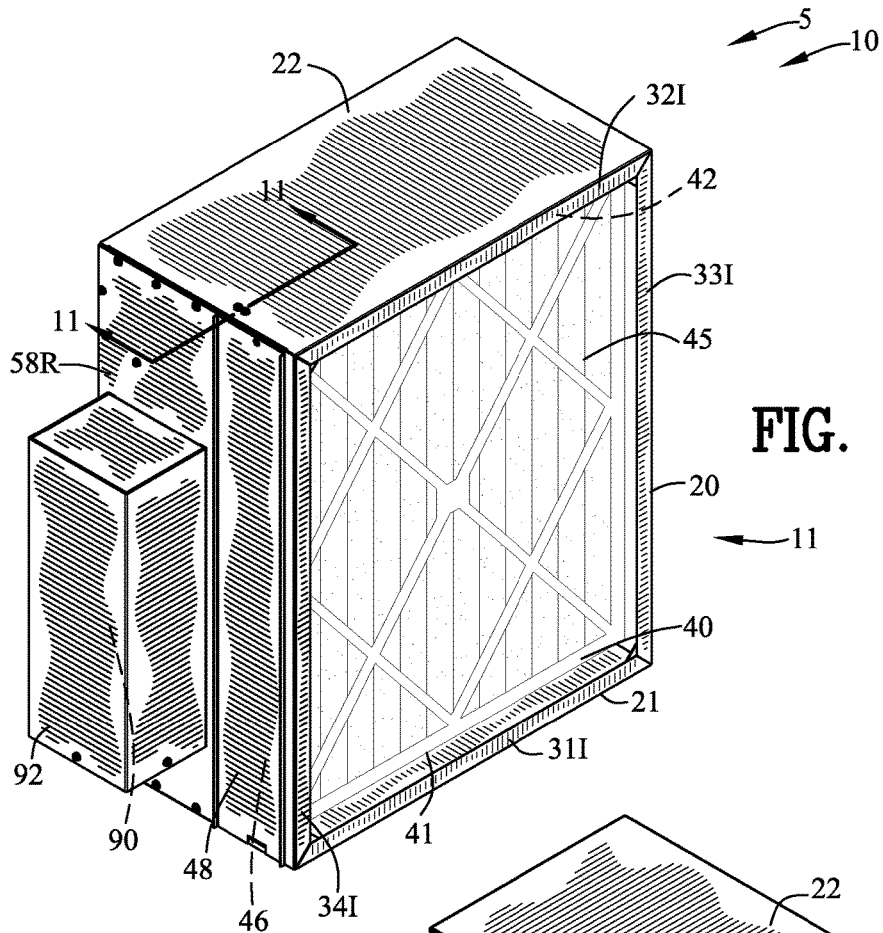
FIG. 8 is an isometric view similar to FIG. 1 illustrating the air purification system incorporating electronic grid generator and the grid array.
Figure 9:
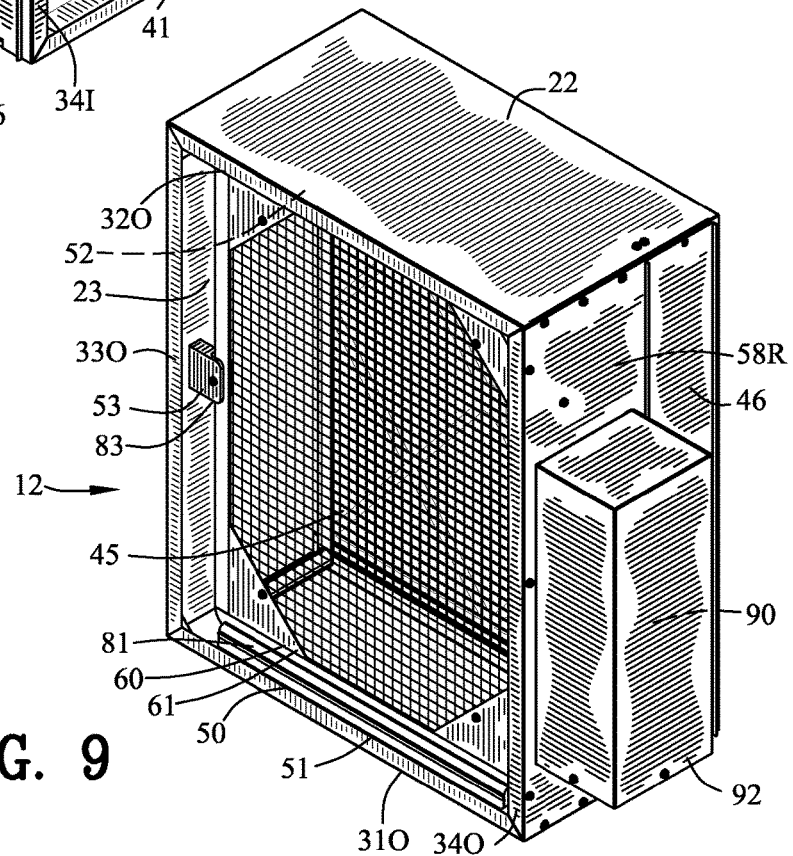
FIG. 9 is an isometric view similar to FIG. 2 illustrating the air purification system incorporating electronic grid generator and the grid array.

FIGS. 7-9 are isometric view illustrating a generator cover 92 secured to the replacement grid closure 58R for enclosing the electronic generator 90. The electronic generator 90 generates electric fields for the first and second grids 61 and 62 for agglomerating particles within air passing from the air input 11 to the air output 12 of the plenum 10. A more through explanation of the electronic generator 90 may be found in U.S. Pat. No. 5,542,964 to Kroeger, et al. which is incorporated by reference as if fully set forth herein.

Figure 10:
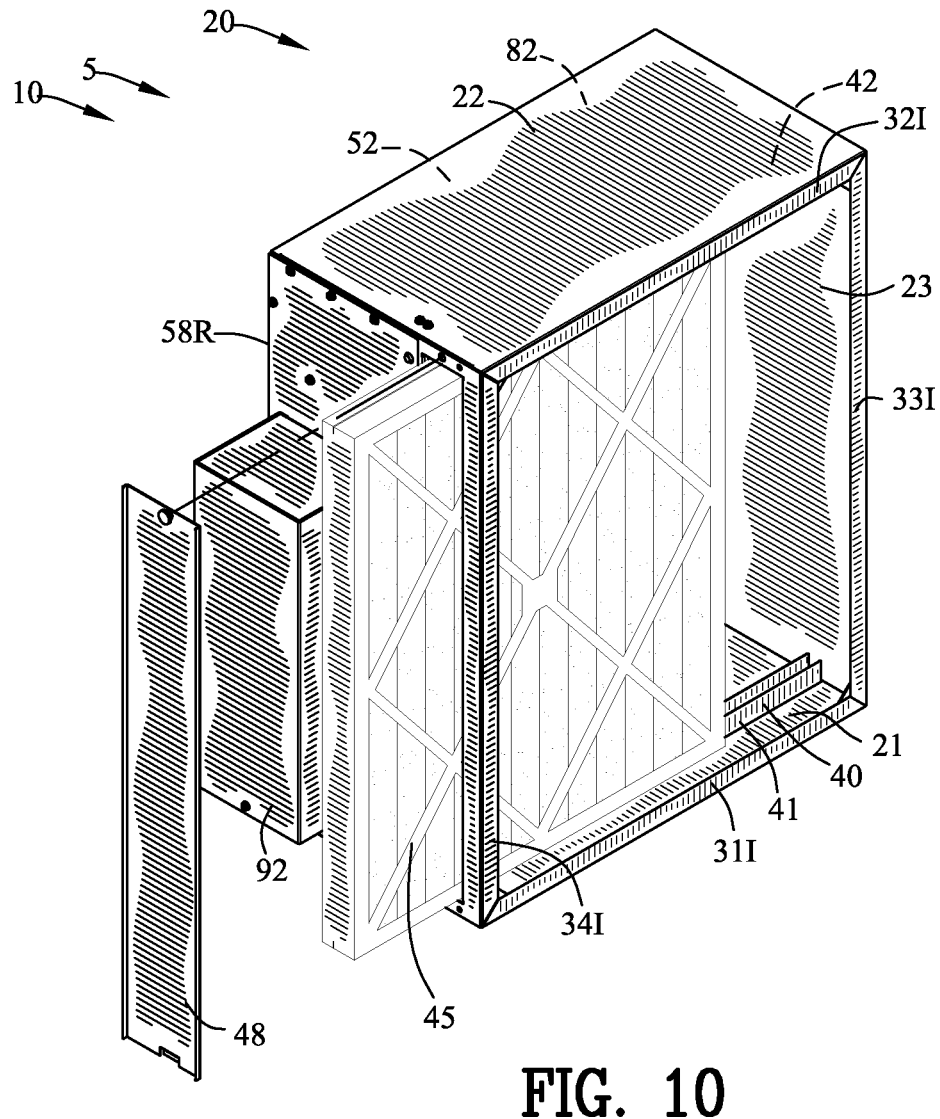
FIG. 10 illustrates the removal of an air filter from the frame of the air purification system of FIG. 8.
Figure 11:
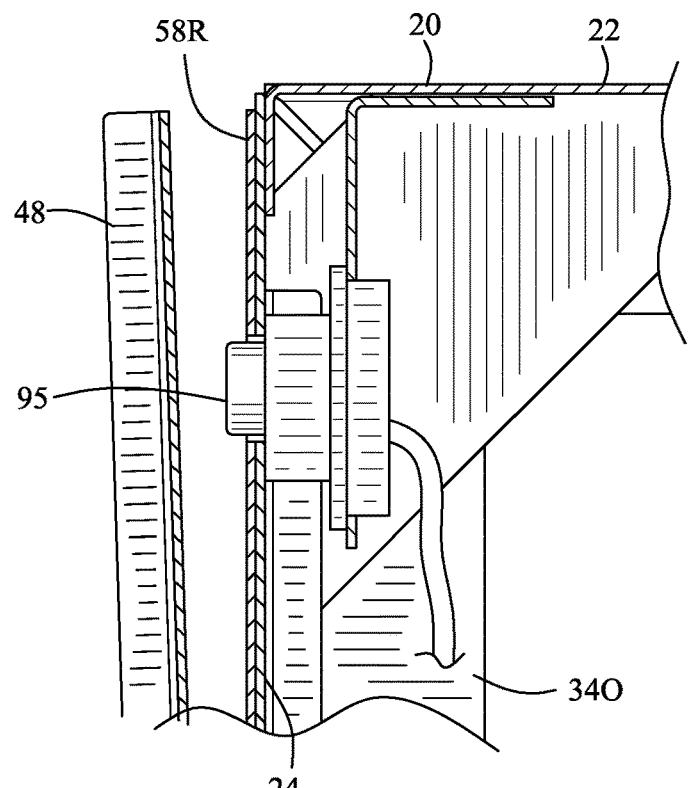
FIG. 11 is a sectional view along a line 11-11 in FIG. 8 illustrating the removal of an air filter aperture closure to open a disconnect switch for terminating operation of the electronic generator.
Figure 12:
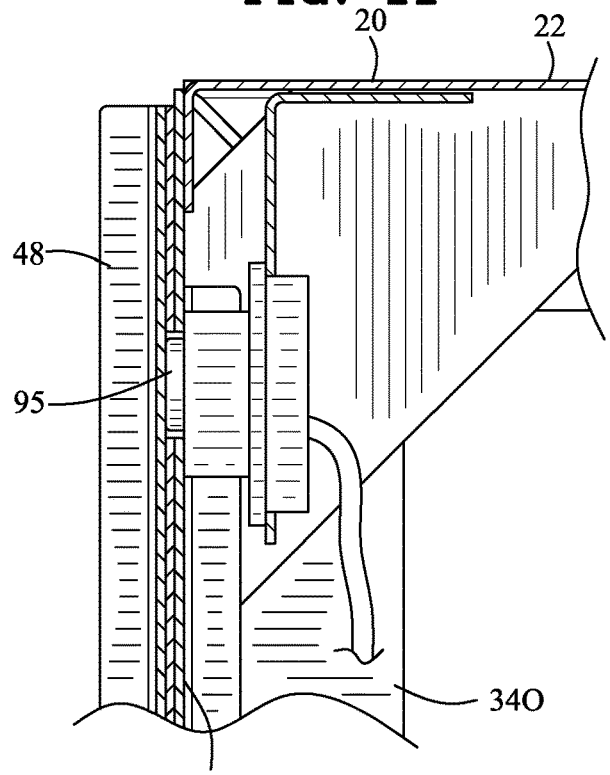
FIG. 12 is a view similar to FIG. 11 illustrating the reinstallation of the air filter aperture closure to close the disconnect switch for reactivating the electronic generator to the grid array.

FIGS. 10-12 illustrate the removal of the air filter aperture closure 48 for removing and replacing the air filter 45. A disconnect switch 95 is mounted in proximity to the air filter aperture closure 48. The disconnect switch 95 is connected to the electronic generator 90 for providing a safety interlock for the high voltage applied to the grid array 60.

FIG. 11 illustrates the disconnect switch 95 upon opening of the air filter aperture closure 48. The disconnect switch 95 terminates operation of the electronic generator 90 for de-energizing the grid array 60 upon removal of the filter aperture closure 48.

FIG. 12 illustrate a disconnect switch 95 upon reinstalling the air filter aperture closure 48. The disconnect switch 95 enables operation of the electronic generator 90 for energizing the grid array 60 upon reinstallation of the filter aperture closure 48.

FIGS. 13-23 are similar to FIGS. 1-12 illustrating a second embodiment of the air purification system 105 of the present invention. Similar parts are labeled with similar reference characters raised by 100.

The second embodiment of the present invention enables the plenum 110 to be upgraded into air purification system 105 in a faster and less complicated installation. The second embodiment of the air purification system 105 eliminates the need to interconnect the grid array 160 to the electronic generator 190. In addition, the second embodiment of the air purification system 105 eliminates the need to wire the disconnect switch 195 to the electronic generator 190.

The air purification system 105 comprises a plenum 110 for connection to the input of the conventional air conditioning heating system (not shown). The plenum 110 comprises a frame 120 having peripheral walls 121-124 defining an air input 111 and an air output 112 to the plenum 110.

An air filter track 140 is secured relative to the frame 120 for positioning an air filer between the air input 111 and the air output 112 of the plenum 110. Preferably, the air filter track 140 comprises a first through fourth air filter tracks 141-144 secured to opposite peripheral walls 121-124 for slidably receiving a conventional air filter 145.

A selected peripheral wall 124 defines an air filter aperture 146 defined in a selected peripheral wall 124 adjacent to the air filter track 140. The selected peripheral wall 124 is removable from the frame 120.

Figure 13:
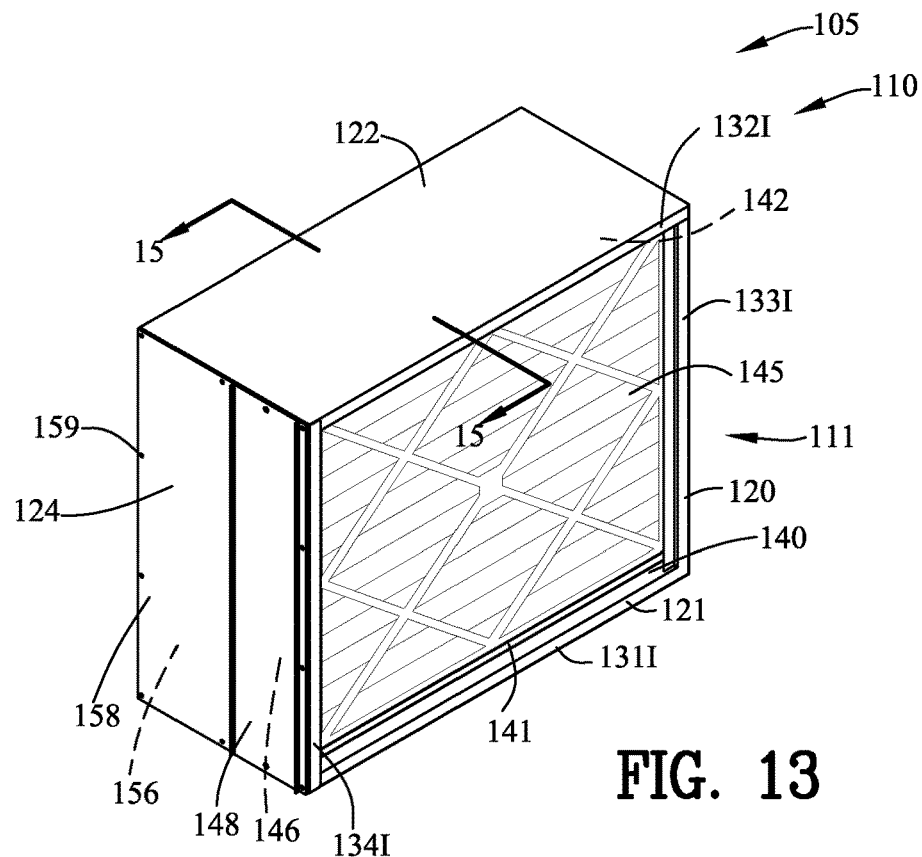
FIG. 13 is an isometric view illustrating an input of a second embodiment of the air plenum of the present invention.
Figure 16:
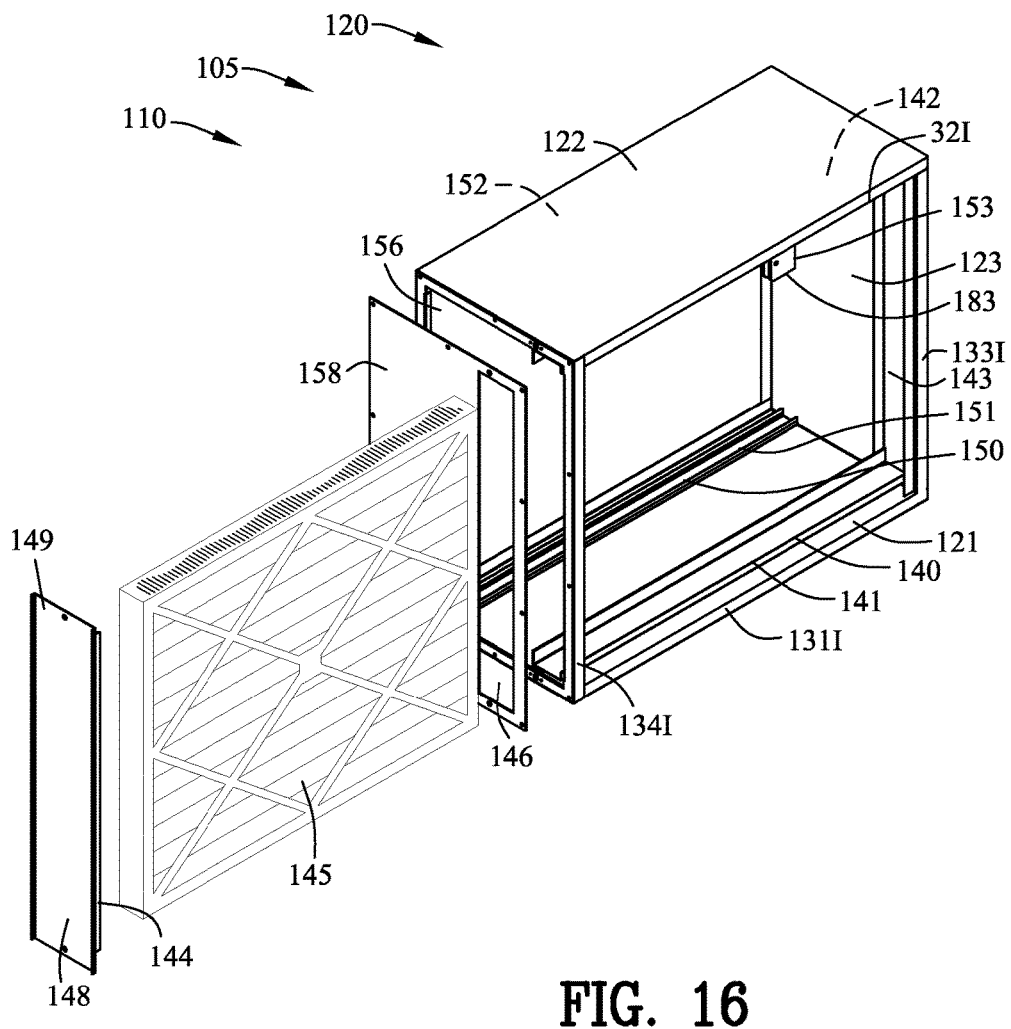
FIG. 16 is an exploded view of FIG. 13.

FIG. 16 is an exploded view of FIG. 13. An air filter aperture closure 148 is removably secured to the selected peripheral wall 124 for covering the filter aperture 146. Conventional mechanical fasteners 149 are provided for removably securing the air filter aperture closure 148 to the selected peripheral wall 124. The air filter aperture closure 148 enables the air filter 145 to be introduced and removed from the air filter track 140.

A grid track 150 is secured relative to the frame 120 downstream from the air filter track 140. Preferably, the grid track 150 comprises a first and a second grid track 151 and 152 secured to the opposite peripheral walls 121 and 122. A third grid track 153 is secured to the peripheral wall 123.

A replacement peripheral wall 158R is dimensioned substantially identically to the selected peripheral wall 124. A replacement air filter aperture 146R is defined in the replacement peripheral wall 158R adjacent to the air filter track 140.

Figure 17:
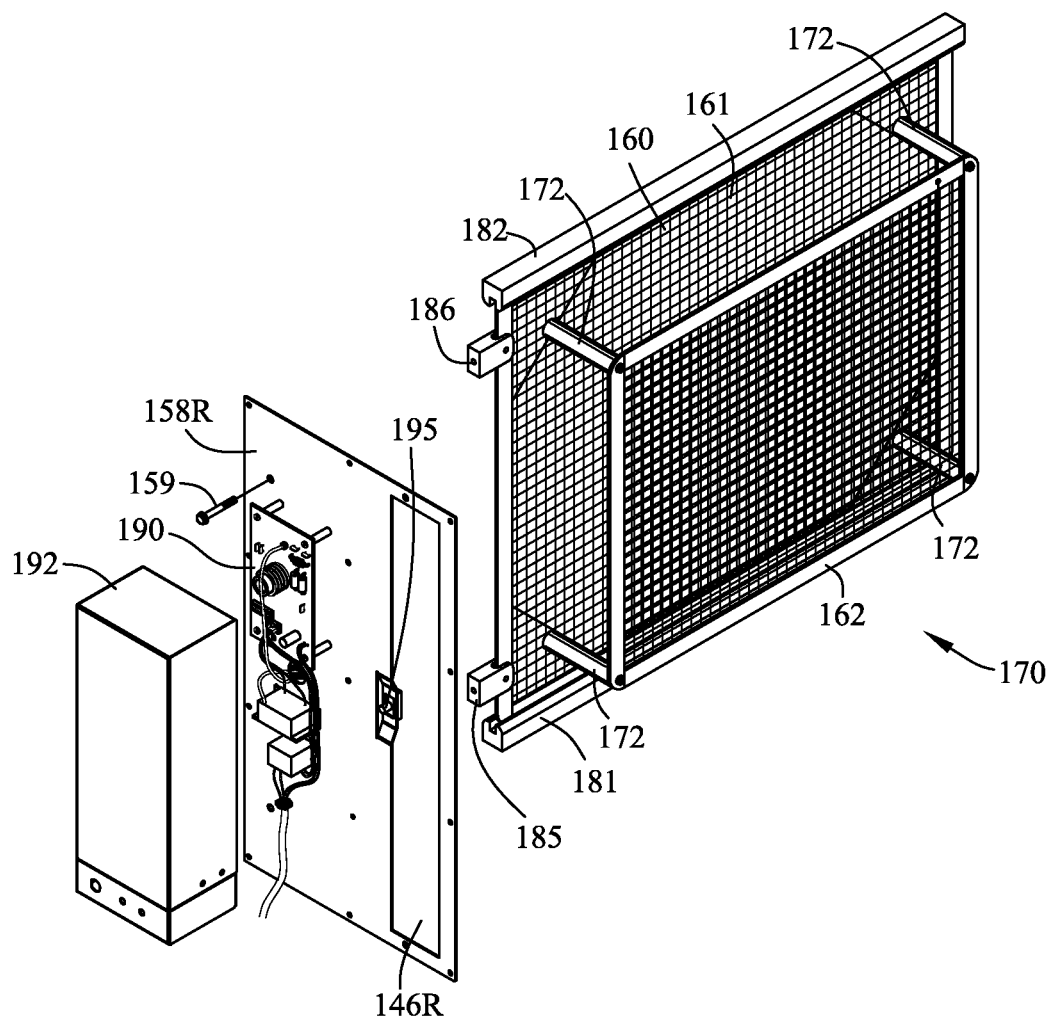
FIG. 17 is an exploded view of an air purifying system of the present invention.

FIG. 17 is an exploded view of an air purifying system 105 of the present invention. A grid array 160 is secured to an inside side surface of the replacement peripheral wall 158R. An electronic generator 190 is mounted to an outer surface of the replacement peripheral wall 158R and connected to the grid array 160.

Insulators 170 insulate the first and second grids 161 and 162 from each other and insulate the grid array 160 from the frame 120. A first insulator 171 insulates the first grid 161 of the grid array 160 from the frame 120 The second insulator 172 insulates the second grid 162 from the first grid 161 The first insulator 171 comprises insulators 181-183 for insulating the first grid 161 from the peripheral walls 121-123. The insulators 181 and 182 are inserted into the first and second grid track 151-153. The first grid 161 is slidably received within slots in the insulators 181 and 182. Insulators 185 and 186 insulate the first grid 161 from replacement peripheral wall 158R.

Figure 18:
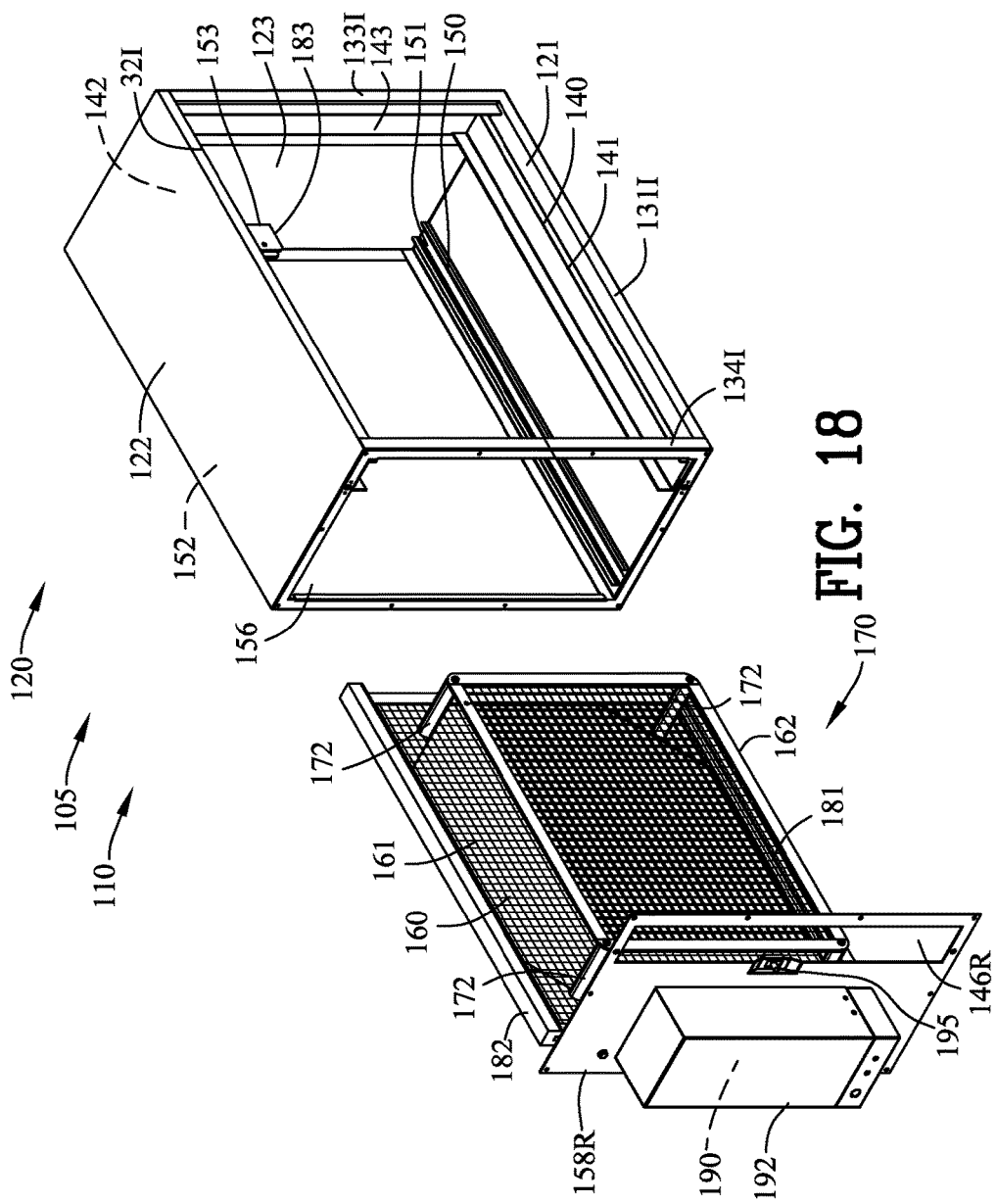
FIG. 18 is an isometric view illustrating the insertion of air purifying system of the present invention into the air plenum of FIGS. 13-16.

FIG. 18 is an isometric view illustrating the insertion of air purifying system 105 of the present invention into the air plenum 110 of FIGS. 13-16. The replacement peripheral wall 158R is inserted into the frame 120 with the grid array 160 received within the grid track 150 and with the electronic generator 190 mounted to an outer surface of the replacement peripheral wall 158R. The electronic generator 190 is pre-wired to the grid array 160. Furthermore, the disconnect switch is pre-wired to the electronic generator 190.

Figure 19:
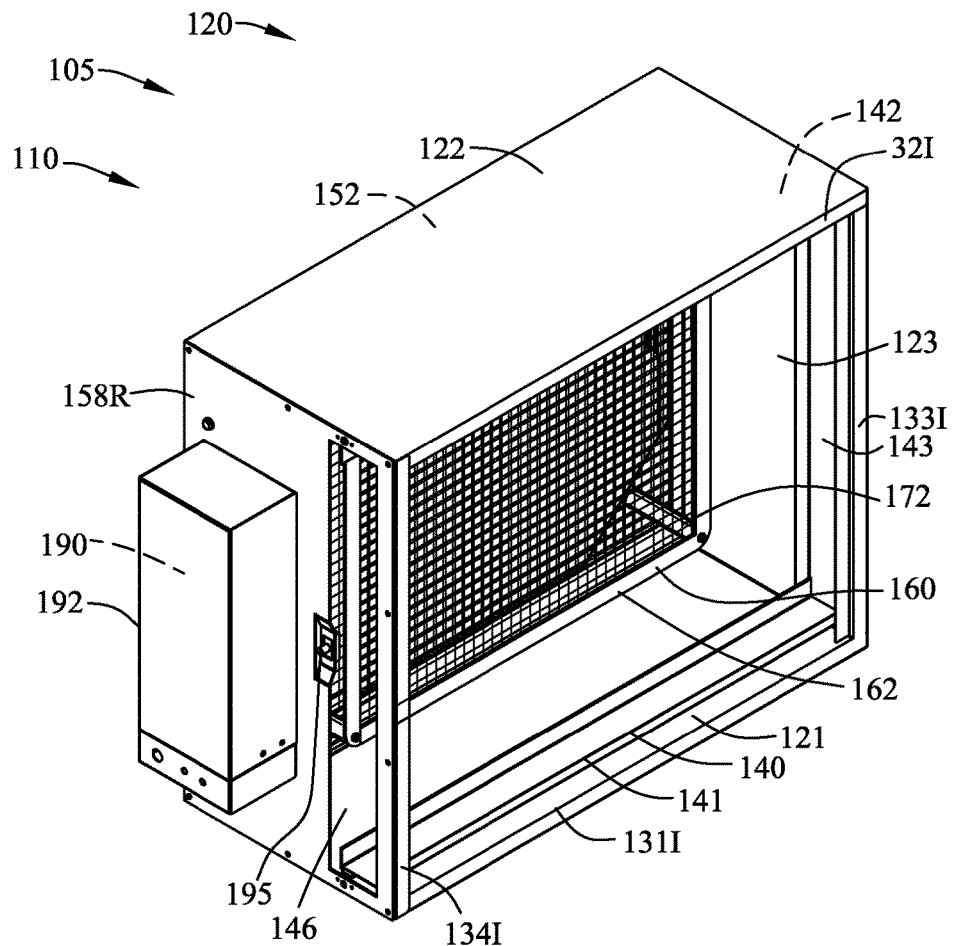
FIG. 19 illustrates the complete installation of the air purifying system of the present invention into the air plenum.

FIG. 19 illustrates the complete installation of the air purifying system 105 of the present invention into the air plenum 110.

Figure 20:
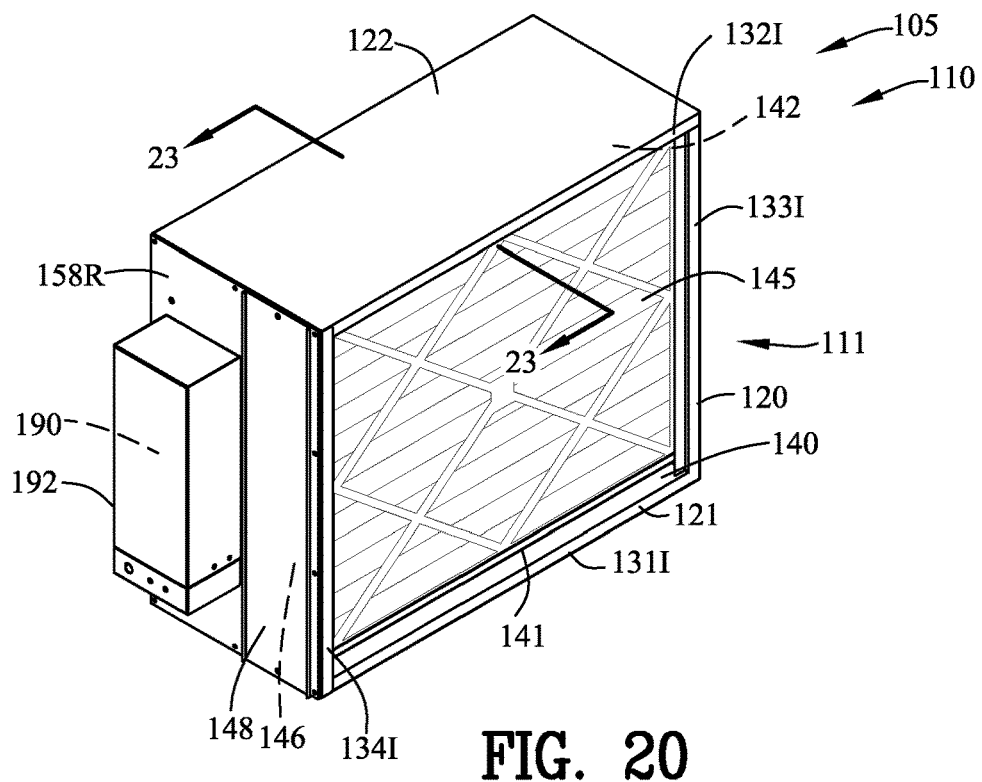
FIG. 20 is an isometric view similar to FIG. 13 illustrating the air purification system incorporating electronic grid generator and the grid array.

FIG. 20 is an isometric view similar to FIG. 13 illustrating the air purification system 105 incorporating electronic generator 190 and the grid array 160.

Figure 14:
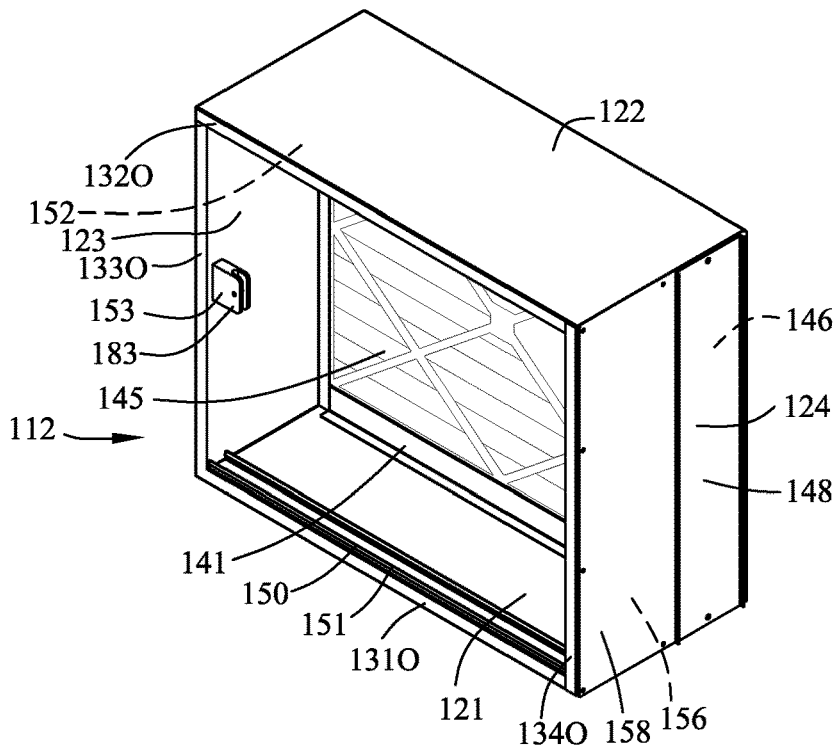
FIG. 14 is an isometric view illustrating an output of the air plenum of FIG. 13.
Figure 15:
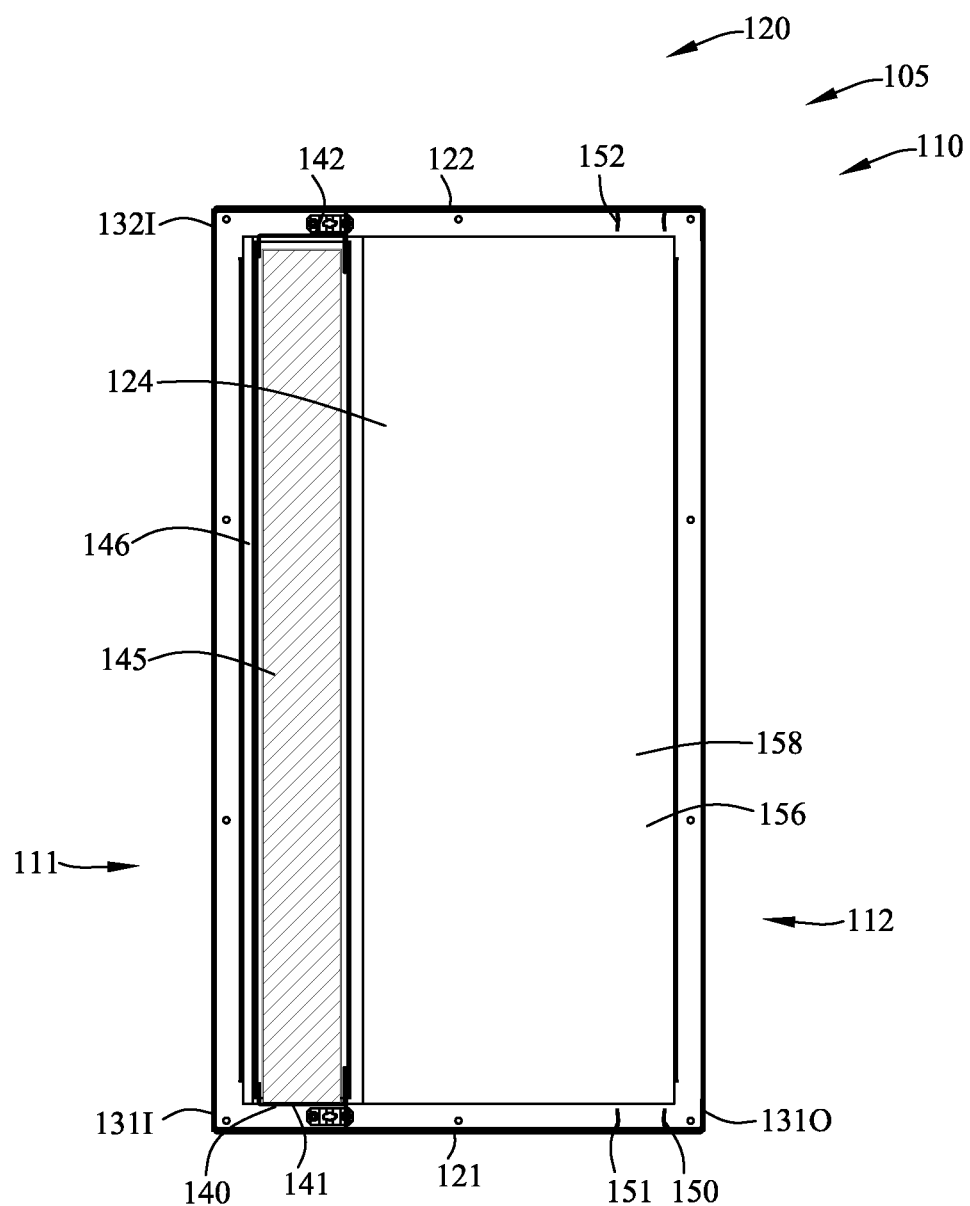
FIG. 15 is a sectional view along a line 15-15 in FIG. 13.
Figure 21:
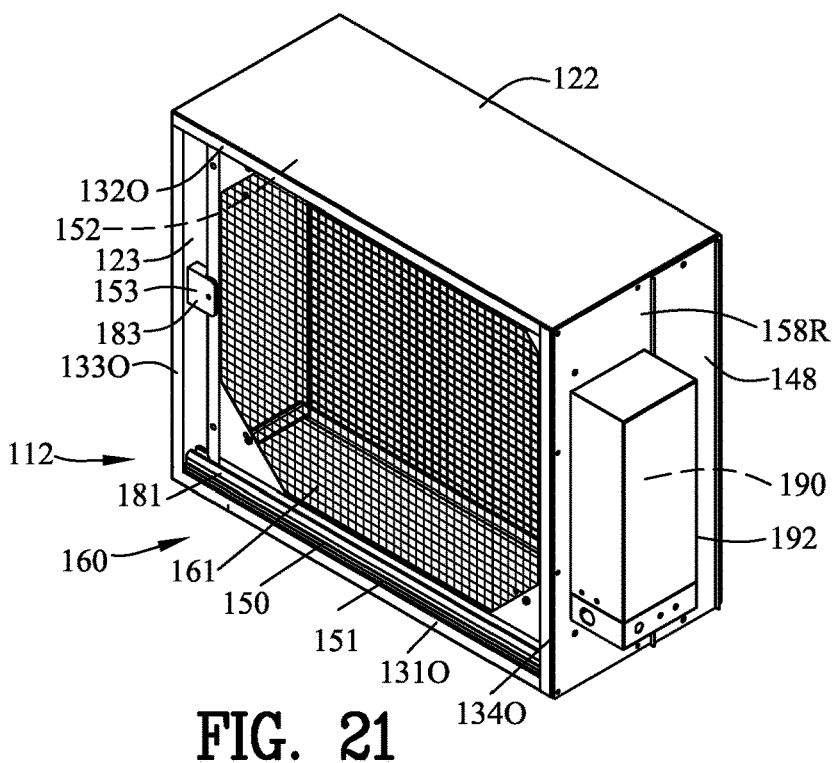
FIG. 21 is an isometric view similar to FIG. 14 illustrating the air purification system incorporating electronic grid generator and the grid array.
Figure 22:
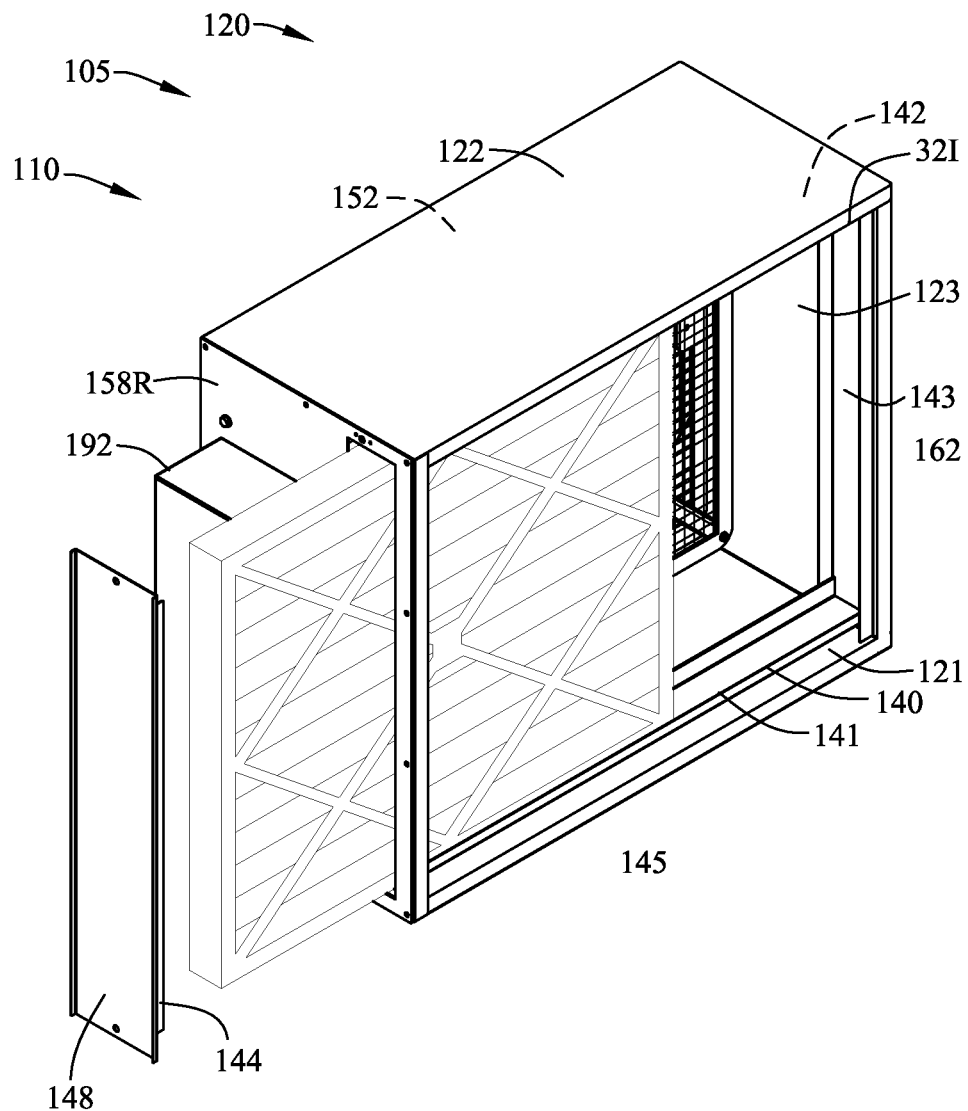
FIG. 22 illustrates the removal of an air filter from the frame of the air purification system of FIG. 20.

FIG. 21 is an isometric view similar to FIG. 14 illustrating the air purification system 105 incorporating electronic generator 190 and the grid array 160;

FIG. 22 illustrates the removal of an air filter 145 from the frame 120 of the air purification system 105 of FIG. 20.

Figure 23:
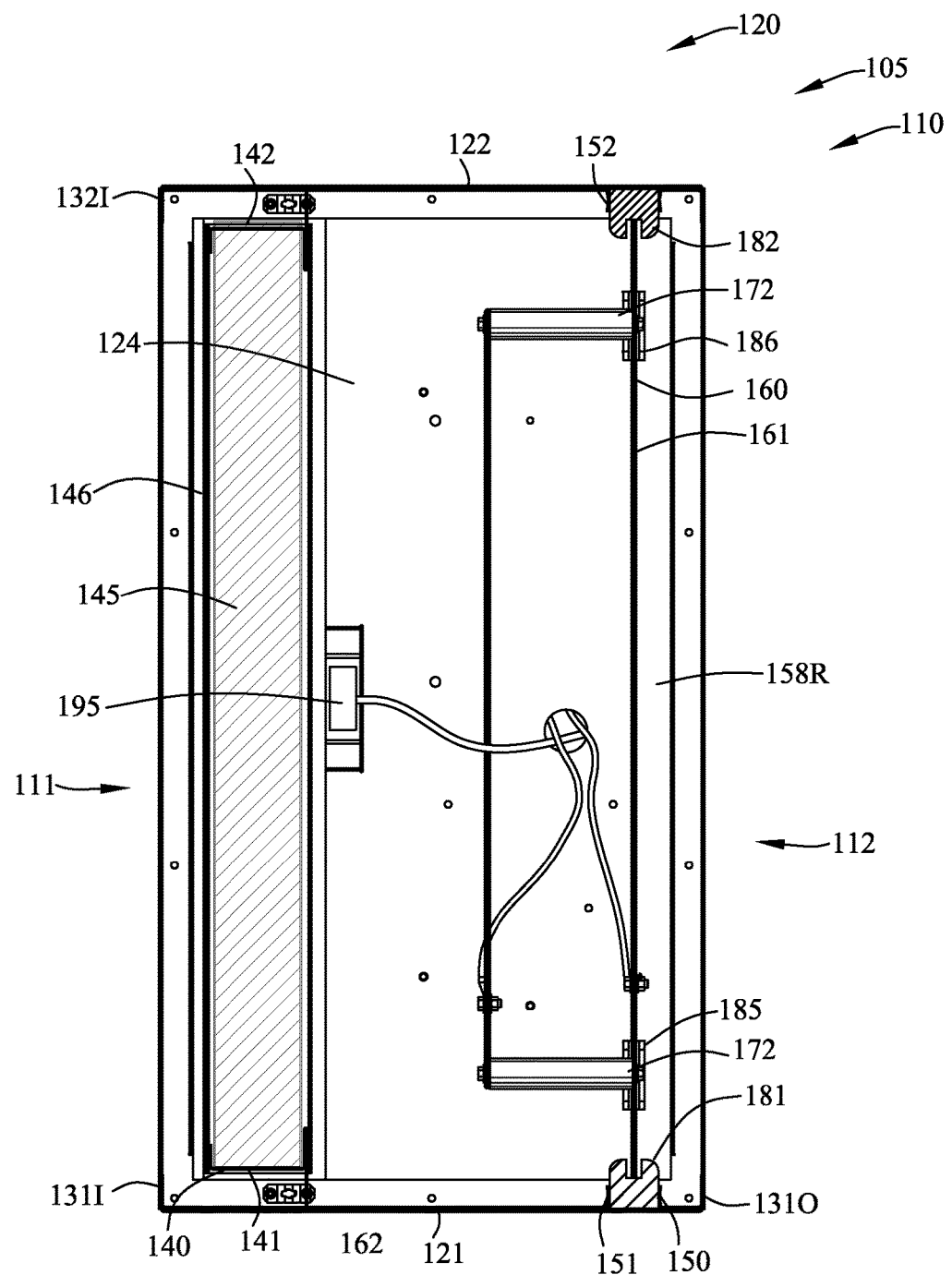
FIG. 23 is a sectional view along a line 23-23 in FIG. 20 illustrating a disconnect switch for disconnecting the electronic grid generator upon opening an air filter access panel.

FIG. 23 is a sectional view along a line 23-23 in FIG. 20 illustrating a disconnect switch 195 for disconnecting the electronic generator 190 upon opening the air filter aperture closure 148.

Figure 24:
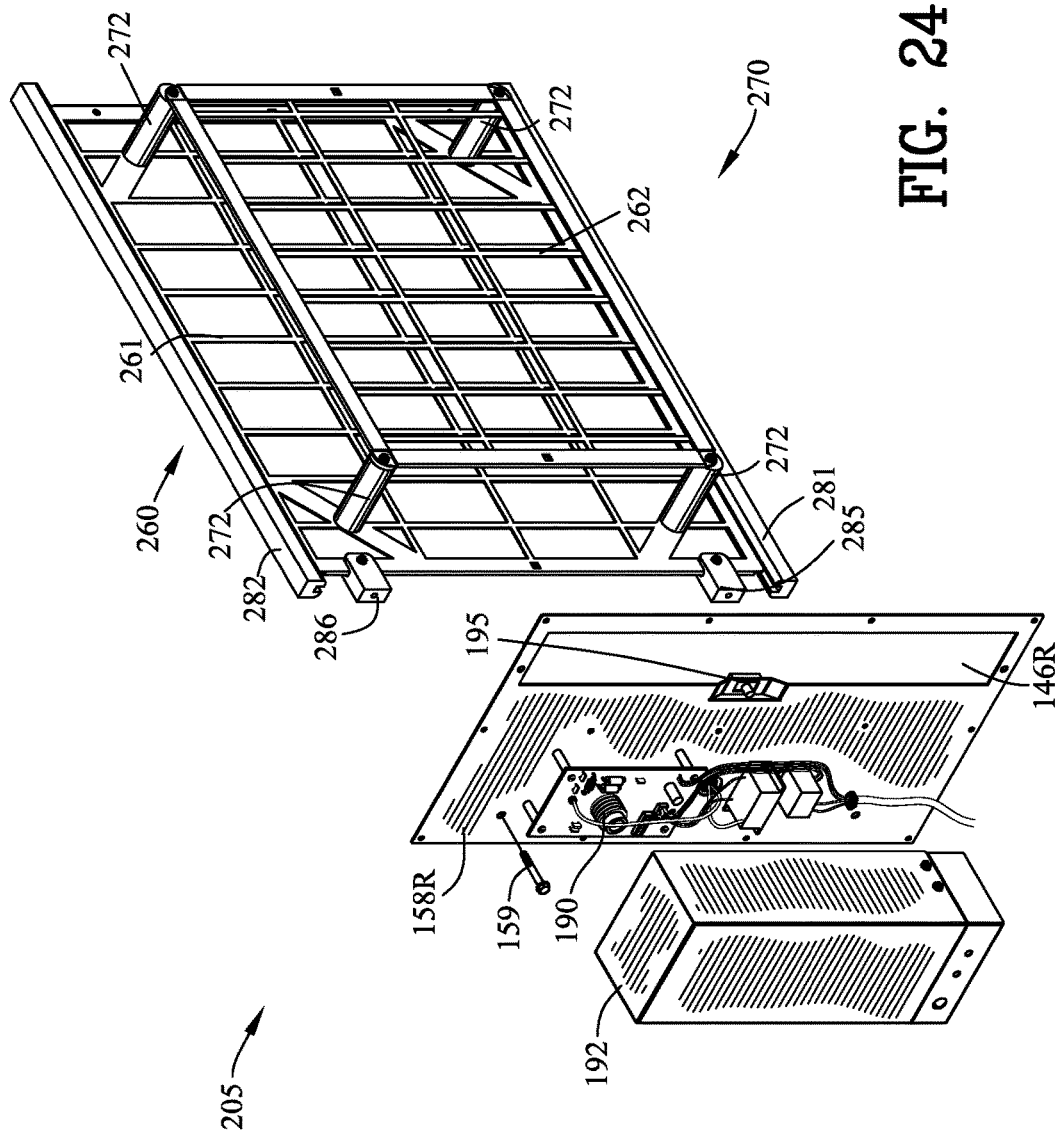
FIG. 24 is an exploded view of the air purifying system incorporating an improved grid array incorporating the present invention.
Figure 25:
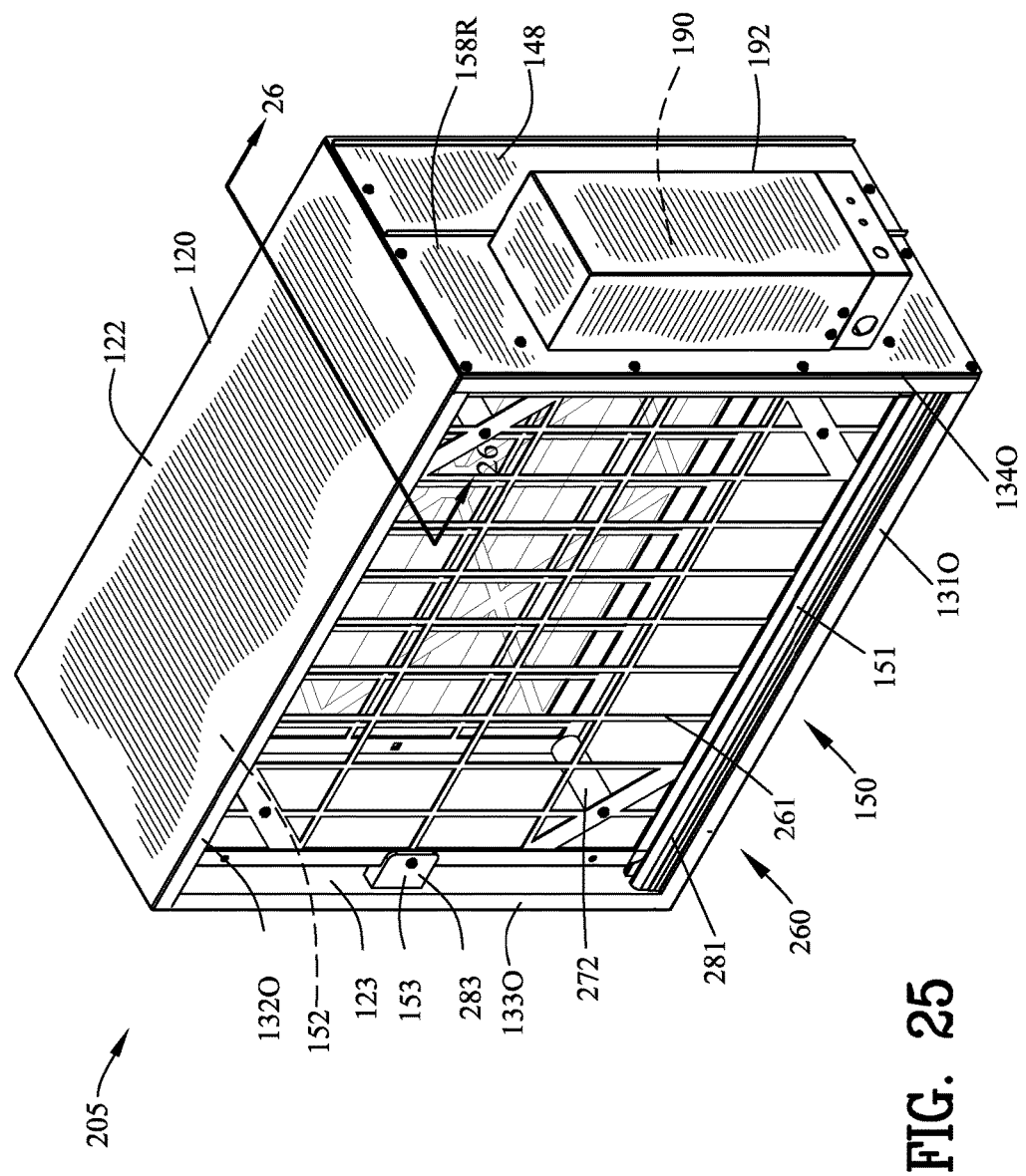
FIG. 25 is an isometric view illustrating the insertion of air purifying system of FIG. 24 into the air plenum of FIGS. 13-16.
Figure 26:
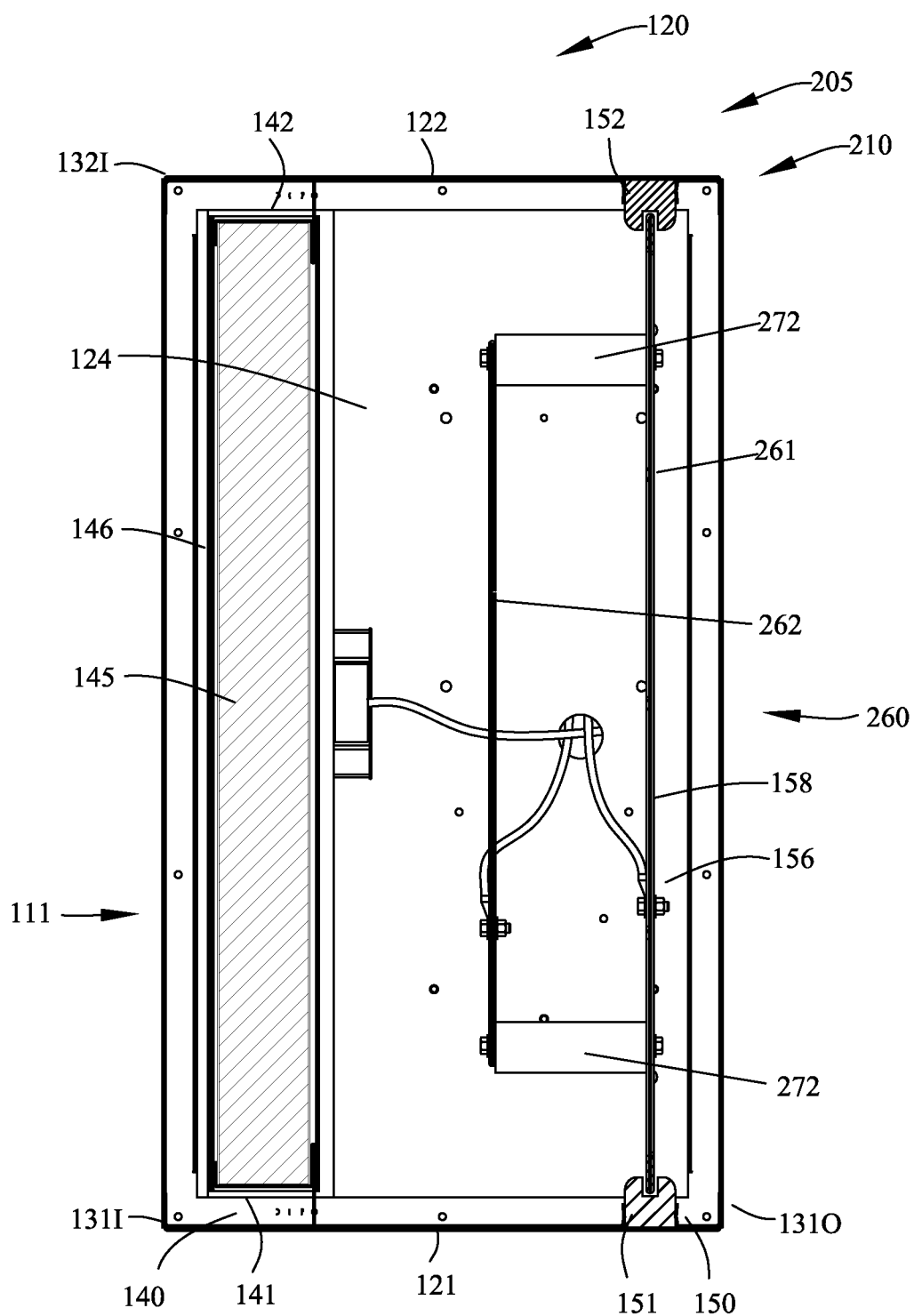
FIG. 26 is a sectional view along a line 26-26 in FIG. 25.

FIGS. 24-26 are various views of the air purifying system 205 incorporating an improved grid array 260 incorporating the present invention. The grid array 260 comprises a first grid 261 and a second grid 262. A grid array 260 is secured to an inside side surface of the replacement peripheral wall 158R. The electronic generator 190 is mounted to the outer surface of the replacement peripheral wall 158R and connected to the grid array 260. The improved grid array 260 is compatible with the air purifying system 5 of FIGS. 1-12 as well as the air purifying system 105 of FIGS. 13-23.

Insulators 270 comprise first insulators 271 and second insulators 272. The first insulators 271 insulate the first grids 261 from the frame 120 as heretofore described. The first insulators 271 comprise insulators 281-282 for insulating the first grid 261 from the peripheral walls 121-123. The insulators 281 and 282 are inserted into the first and second grid track 151-153 in a manner set forth previously. The second insulators 272 insulate the second grid 262 from the first grid 261. Insulators 285 and 286 insulate the first grid 261 from replacement peripheral wall 158R. The first grid 261 is dimensionally larger than the second grid 262 for spacing the second grid 262 from the peripheral sidewalls 121-124 of the frame 120.

FIGS. 27-31 are various views of the improved grid array of FIGS. 24-26. The first grid array 261 comprises a one-piece first grid 261 formed from a single sheet of conductive material 263. Preferably, the single sheet of conductive material 263 is a single sheet of a conductive metallic material such as steel, aluminum or the like. The single sheet of the conductive material 263 extends between terminal ends 301-304.

The second grid array 262 comprises a one-piece second grid formed from a single sheet of conductive material 264. Preferably, the single sheet of conductive material 264 is a single sheet of a conductive metallic material such as steel, aluminum or the like. The single sheet of the conductive material 264 extends between terminal ends 321-324.

Figure 32:
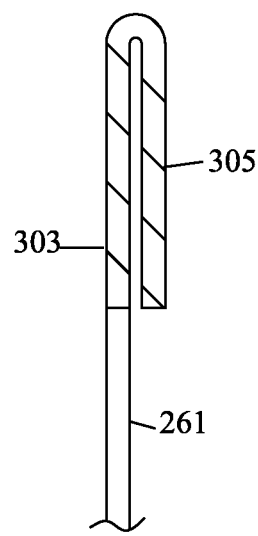
FIG. 32 is a magnified sectional view along a line 32-32 in FIG. 30.
Figure 33:
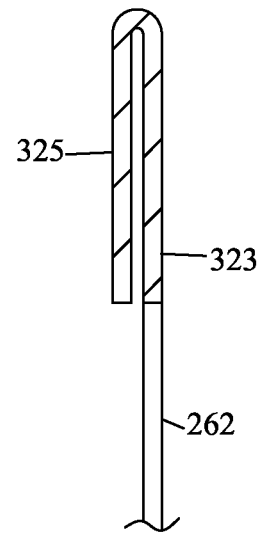
FIG. 33 is a magnified sectional view along a line 33-33 in FIG. 30.
Figure 34:
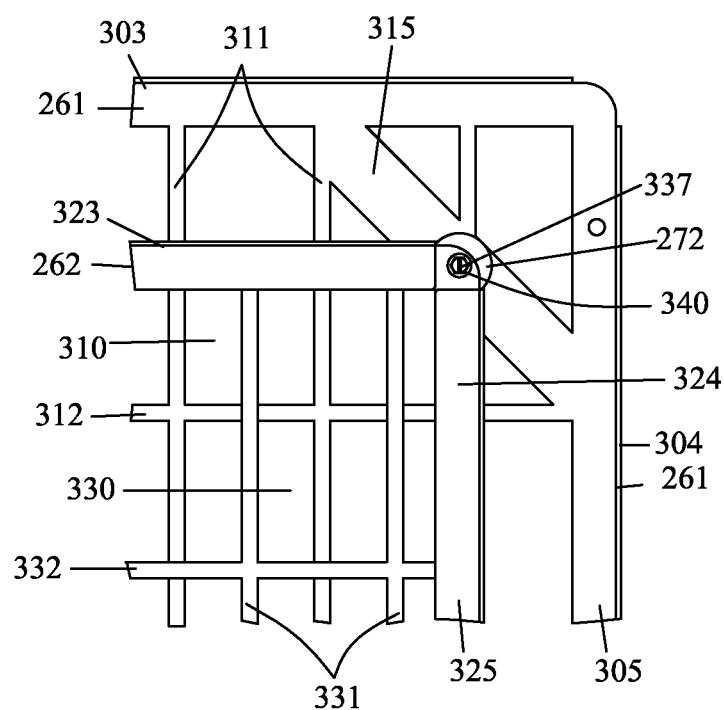
FIG. 34 is a magnified view of a portion of FIG. 29.

FIGS. 32 and 33 are magnified views of portions of FIG. 30 illustrating the first and second grids 261 and 262. The terminal ends 301-304 of the conductive material 263 of the first grid 261 form a peripheral frame 305 extending about periphery of the first grid 261. In a similar manner, the terminal ends 321-324 of the conductive material 264 form a peripheral frame 325 extending about periphery of the one-piece second grid 262.

In this example, the peripheral frame 305 of the first grid 261 is formed by bending a portion of each of the terminal ends 301-304 one hundred and eighty degrees (180°) about a radius. Similar, the peripheral frame 325 of the first grid 262 is formed by bending a portion of each of the terminal ends 321-324 one hundred and eighty degrees (180°) about a radius. Although the peripheral frames 305 and 325 have been shown as bends in the terminal ends of the first and second grids 261 and 262, it should be understood that numerous other means may be employed to form the peripheral frames 305 and 325.

Referring back to FIGS. 27-31, a plurality of first apertures 310 are formed in the one piece first grid 261 defining a multiplicity of first grid elements 311 and a multiplicity of first transverse grid elements 312. In the example, the majority of the plurality of first apertures are quadrilateral and more specifically regular quadrilateral or rectangular. The regular quadrilateral first apertures establish the first transverse grid elements 311 to extend perpendicular to the first grid elements 312.

A minority of the first apertures 310 are triangular for defining a plurality of first mounting braces 315 integrally formed in the one-piece first grid 261. In addition, a minority of the first apertures 310 defining a plurality of circular holes 317 in the first mounting braces 315 for mounting the second insulators 272. Although the plurality of first apertures 310 have been shown to be quadrilateral, triangular or circular, it should be understood that the first apertures 310 may be any other suitable shape.

In a similar manner, a plurality of second apertures 330 are formed in the second one piece grid 262 defining a multiplicity of second grid elements 331 and a multiplicity of second transverse grid elements 332. The majority of the plurality of second apertures 330 are quadrilateral and more specifically regular quadrilateral or rectangular. The regular quadrilateral second apertures 330 establish the second transverse grid elements 332 to extend perpendicular to the second grid elements 331. A minority of apertures 330 are circular holes 337 in the second grid 262 for mounting the second insulators 272. Although the plurality of second apertures 330 have been shown to be quadrilateral or circular, it should be understood that the apertures may be any other suitable shape.

The second insulators 272 secure the second grid 262 to the first grid 261 by a plurality of fasteners 340 extending through the holes 317 defined in the braces 315 and the holes 337 defined in the second grid 262.

The second grid elements 331 and second transverse grid elements 332 of the second grid 262 are offset relative to the multiplicity of first grid elements 311 and first transverse grid elements 332 of the first grid 261. Preferably, the intersection second grid elements 331 and second transverse grid elements 332 of the second grid 262 are centered within the first apertures 310 of the first grid 261 as best shown in FIG. 29.

Each of the multiplicity of first grid elements 311 and the multiplicity of first transverse grid elements 312 have a width less than forty percent of a width of the first peripheral frame 305. Each of the multiplicity of first grid elements 311 and the multiplicity of first transverse grid elements 312 have the same thickness.

The first peripheral frame 305 has a thickness equal to or greater than the thickness of the first grid elements 311 and the first transverse grid elements 312. In the example shown in FIG. 32, the peripheral frame 305 has a thickness equal to or greater than twice the thickness of the first grid elements 311 or the thickness of first transverse grid elements 312.

Each of the second grid elements 331 and the second transverse grid elements 332 have a width less that forty percent the width of the second peripheral frame 325. Each of the second grid elements 331 and the second transverse grid elements 332 have the same thickness.

The second peripheral frame 325 has a thickness equal to or greater than the thickness of the second grid elements 331 and the second transverse grid elements 332. In the example shown in FIG. 33, the peripheral frame 325 has a thickness equal to or greater than twice the thickness of the second grid elements 331 or the thickness of the second transverse grid elements 332.

The invention is incorporated into the method of making a one-piece grid. The method comprises providing a one-piece sheet of a conductive material. A plurality of apertures are cut into the one-piece of conductive material to form a multiplicity of grid elements and a multiplicity of intersecting transverse grid elements. The grids may be cut from a single sheet of conductive material in various ways including stamping, molding, water jet cutting or laser cutting. The step of cutting a single sheet of conductive material may form braces in the grid for supporting the grid. A peripheral frame may be formed bending terminal ends of the one-piece grid.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claims is:

1. An upgradable input plenum for mounting to an air conditioning/heating unit, comprising:
    a frame having peripheral walls defining an air input and an air output;
    an air filter track secured relative to said frame for positioning an air filter between said air input and said air output;
    an air filter aperture defined in a selected peripheral wall adjacent to said air filter track;
    an air filter aperture closure for removably covering said air filter aperture for introducing and removing the air filter into said air filter track;
    a grid track secured within said frame for positioning an electrified grid array between said air input and said air output;
    a grid aperture defined in said selected peripheral wall adjacent and parallel to said air filter aperture;
    a grid aperture closure for removably covering said grid aperture;
    said grid aperture closure being removeable for slidably receiving an electrified grid array within said grid track; and
    a replacement grid aperture closure with an electronic generator mounted to an outer surface of said replacement rid closure for covering said grid aperture and for powering said electrified grid array for generating electric fields for agglomerating particles within air passing from said air input to said air output.

2. An upgradable input plenum for mounting to an air conditioning/heating unit as set forth in claim 1, wherein said air filter track comprises plural air tracks mounted to opposed interior surfaces of said peripheral sidewalls of said frame for receiving an air filter.

3. An upgradable plenum for mounting to an air conditioning/heating unit as set forth in claim 1, wherein said grid track comprises plural grid tracks mounted to opposed interior surfaces of said peripheral sidewalls of said frame for receiving a grid array.

4. An upgradable plenum for mounting to an air conditioning/heating unit as set forth in claim 1, including a first insulator insertable in said grid tracks for mounting said grid array.

5. An upgradable plenum for mounting to an air conditioning/heating unit as set forth in claim 1, wherein said grid array comprises a first and a second grid;
    a first insulator insertable in said grid tracks for mounting said first grid relative to said frame;
    a second insulator comprising a plurality of insulators for spacing said second grid relative to said first grid; and
    said first grid being dimensionally larger than said second grid for spacing said second grid from said peripheral sidewalls of said frame.

6. An upgradable plenum for mounting to an air conditioning/heating unit as set forth in claim 1, including a grid array aperture defined in said selected peripheral wall of said frame adjacent to said grid track,
    a grid array aperture closure removably secured to said frame; and
    said grid array aperture closure being removable for inserting said grid array into said grid track.

7. An upgradable plenum for mounting to an air conditioning/heating unit as set forth in claim 1, including a grid array aperture defined in said selected peripheral wall of said frame adjacent to said grid track, and
    a grid array aperture closure removably secured to said frame for inserting said grid array into said grid track;
    a replacement grid closure secured to said frame for closing said grid aperture; and
    an electronic generator mounted to an outer surface of said replacement grid closure.

8. An upgradable plenum for mounting to an air conditioning/heating unit as set forth in claim 1, wherein said selected peripheral wall is removable from said frame; and
    a replacement peripheral wall containing an air filter aperture and said grid array and an electronic generator for securing to said frame to replace said selected peripheral wall.

9. An upgradable plenum for mounting to an air conditioning/heating unit as set forth in claim 1, wherein said selected peripheral wall is removable from said frame;
    a replacement peripheral wall containing an air filter aperture for securing to said frame to replace said selected peripheral wall;
    said grid array secured to said replacement peripheral wall for insertion into said grid track; and
    an electronic generator mounted to an outer surface of said replacement peripheral wall.

10. An upgradable air purification system for mounting to an air conditioning/heating unit, comprising:
    a frame having peripheral walls defining an air input and an air output;
    an air filter track secured relative to said frame for positioning an air filer between said air input and said air output;
    a filter aperture defined in a selected peripheral wall of said frame for introducing and removing an air filter into said frame between said air input and said air output;
    a filter aperture closure for removably covering said filter aperture for introducing and removing the air filter into said air filter track;
    a grid track secured relative to said frame positioned parallel to said air filter track between said air input and said air output;
    a grid array aperture defined in said selected peripheral wall of said frame adjacent to said grid track;
    a removable grid array closure for covering said grid array aperture for operating the air purification system solely with said filer between said air input and said air output;
    said grid array closure being removable for slideably inserting a grid array into said grid track;
    a replacement grid closure having an electronic generator mounted to an outer surface of said replacement grid closure;
    said replacement grid closure and said electronic generator being secured to said frame for closing said grid aperture and connected to said grid array for generating electric fields for agglomerating particles within air passing from said air input to said air output.

11. An upgradable air purification system for mounting to an air conditioning/heating unit as set forth in claim 10, wherein said grid array comprises a first and a second grid;

a first insulator for insulating said first grid from said frame; and a second insulator for insulating said second grid relative from said first grid.

12. An upgradable air purification system for mounting to an air conditioning/heating unit as set forth in claim 10, including a disconnect switch mounted in proximity to said removable filter access panel for disconnecting said electronic generator from said grid array upon removal of said filter access panel from said frame.

13. An upgradable air purification system for mounting to an air conditioning/heating unit, comprising:

a frame having peripheral walls defining an air input and an air output;

an air filter track secured relative to said frame for positioning an air filter between said air input and said air output;

a grid track secured within said frame positioned parallel to said air filter track between said air input and said air output;

a selected peripheral wall being removable from said frame;

an air filter aperture defined in said selected peripheral wall for introducing and removing an air filter into said frame between said air input and said air output;

a filter aperture closure for removably covering said filter aperture;

a replacement peripheral wall dimensioned substantially identically to said selected peripheral wall;

a replacement air filter aperture defined in said replacement peripheral wall;

a grid array secured to an inside side surface of said replacement peripheral wall;

an electronic generator mounted to an outer surface of said replacement peripheral wall and connected to said grid array;

said replacement peripheral wall replacing said selected peripheral wall and being secured to said frame with said replacement air filter aperture located adjacent to said air filter track and with said grid array located in said grid track for enabling said electronic generator and said grid array to generate electric fields for agglomerating particles within air passing from said air input to said air output.

14. An upgradable air purification system for mounting to an air conditioning/heating unit as set forth in claim 13, wherein said filter aperture closure is secured to said replacement peripheral wall for removably covering said replacement air filter aperture.

15. An upgradable air purification system for mounting to an air conditioning/heating unit as set forth in claim 13, wherein said grid array comprises a first and a second grid;

a first insulator for insulating said first grid from said frame; and a second insulator for insulating said second grid from said first grid.

16. An upgradable air purification system for mounting to an air conditioning/heating unit as set forth in claim 13, including a disconnect switch mounted in proximity to said removable filter access panel for disconnecting said electronic generator from said grid array upon removal of said filter access panel from said frame.

* * * * *